United States Patent
Amanai et al.

(10) Patent No.: US 10,295,787 B2
(45) Date of Patent: May 21, 2019

(54) IMAGE PICKUP APPARATUS

(71) Applicant: OLYMPUS CORPORATION, Hachioji-shi, Tokyo (JP)

(72) Inventors: Takahiro Amanai, Hachioji (JP); Keisuke Takada, Kokubunji (JP); Kyoko Iijima, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/718,986

(22) Filed: Sep. 28, 2017

(65) Prior Publication Data
US 2018/0095247 A1    Apr. 5, 2018

(30) Foreign Application Priority Data
Sep. 30, 2016 (JP) .................. 2016-194471

(51) Int. Cl.
*G02B 9/12* (2006.01)
*G02B 13/00* (2006.01)
*G02B 23/24* (2006.01)
*G02B 13/04* (2006.01)

(52) U.S. Cl.
CPC .......... *G02B 13/0035* (2013.01); *G02B 9/12* (2013.01); *G02B 13/04* (2013.01); *G02B 23/243* (2013.01)

(58) Field of Classification Search
CPC ...... G02B 13/0035; G02B 9/12; G02B 13/04; G02B 23/243
USPC ........................................................ 359/716
See application file for complete search history.

(56) References Cited

U.S. PATENT DOCUMENTS

| | | | | |
|---|---|---|---|---|
| 4,467,361 A | * | 8/1984 | Ohno | ............ G02B 23/243 250/208.1 |
| 2007/0091458 A1 | * | 4/2007 | Asami | .................. G02B 9/12 359/680 |
| 2013/0278714 A1 | | 10/2013 | Hirose | |
| 2014/0376113 A1 | | 12/2014 | Guenter et al. | |

FOREIGN PATENT DOCUMENTS

| | | |
|---|---|---|
| JP | 2013025202 A | 2/2013 |
| WO | 2012090729 A1 | 7/2012 |
| WO | 2016072336 A1 | 5/2016 |

\* cited by examiner

*Primary Examiner* — James R Greece
(74) *Attorney, Agent, or Firm* — Holtz, Holtz & Volek PC

(57) ABSTRACT

An image pickup apparatus includes an image forming optical system which includes an aperture stop and a plurality of lens components, and an image pickup section which has a light-receiving surface which is not flat but is curved to be concave toward the image forming optical system. The image forming optical system includes a first lens component having a negative refractive power, a second lens component having a positive refractive power, and a third lens component having a positive refractive power. In the first lens component, a lens surface on the object side is convex toward the object side, and in a lens surface on the object side of the second lens component, a part of an area is concave toward the object side. Moreover, the following conditional expression (1) is satisfied:

$$0.5 < (R1L + R1R)/(R1L - R1R) < 2.5 \quad (1).$$

20 Claims, 17 Drawing Sheets

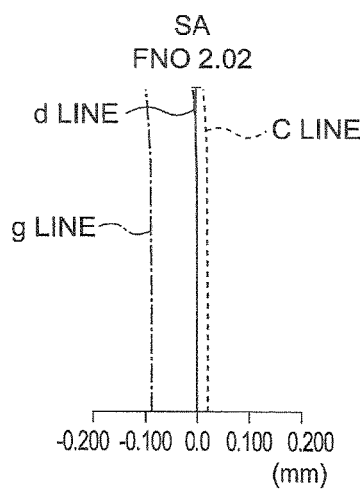
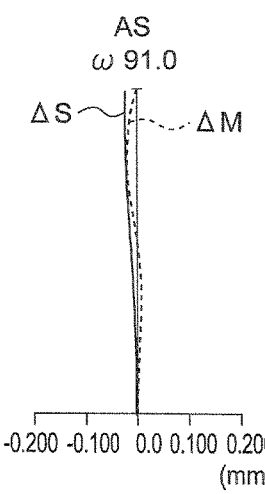
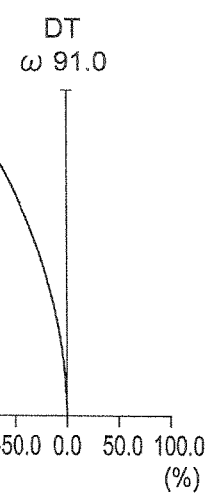
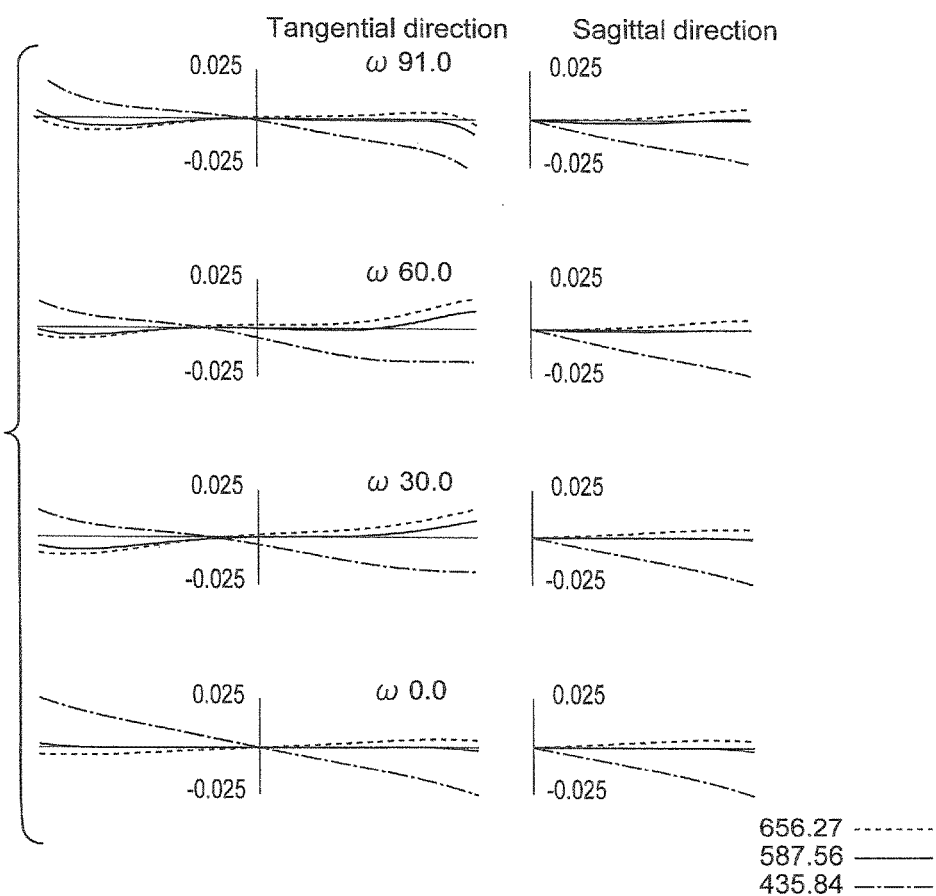

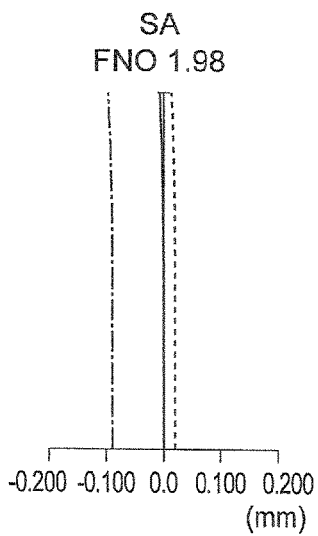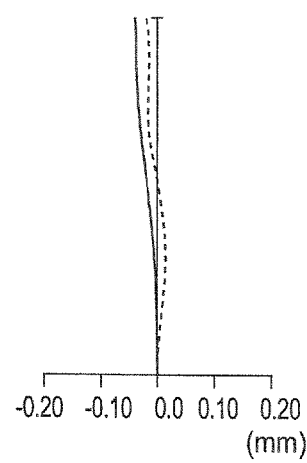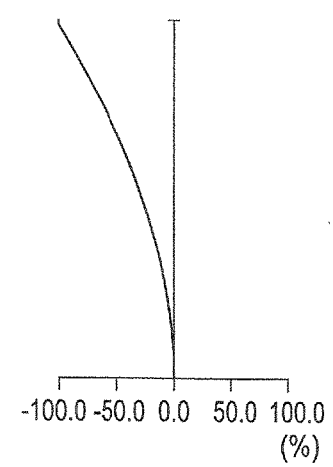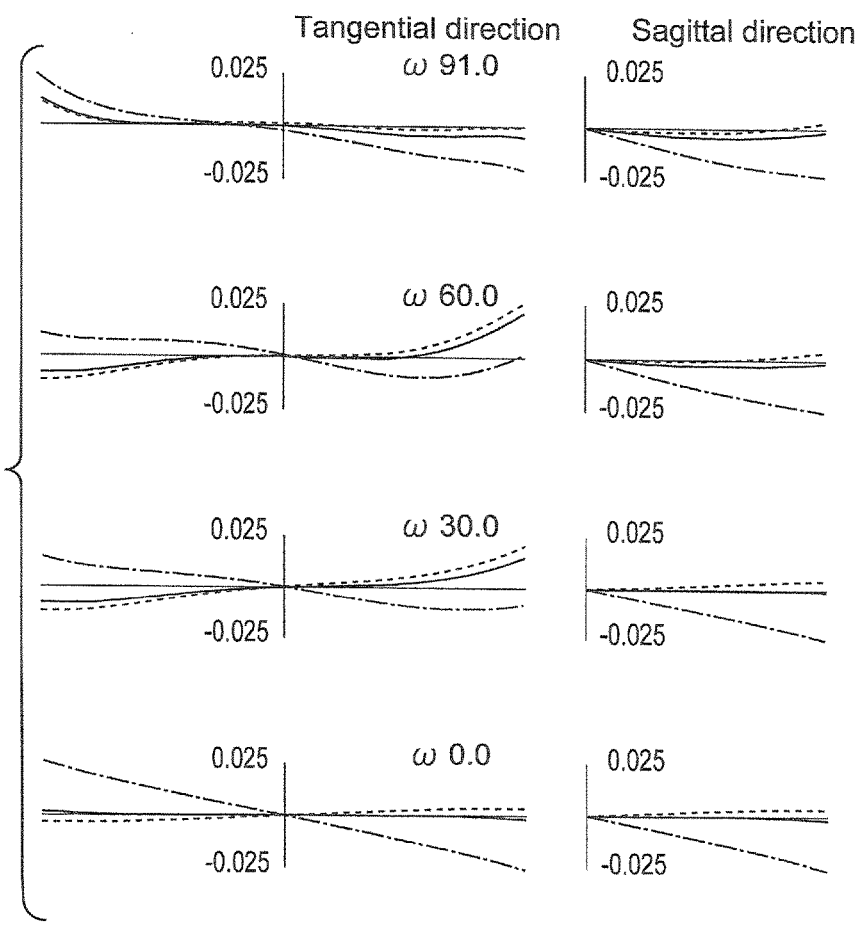

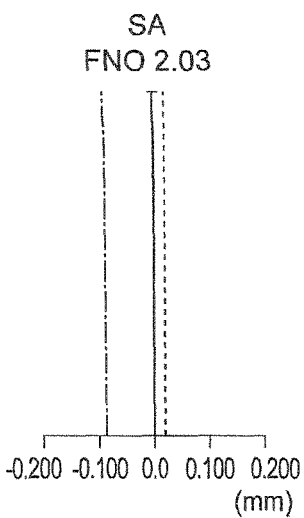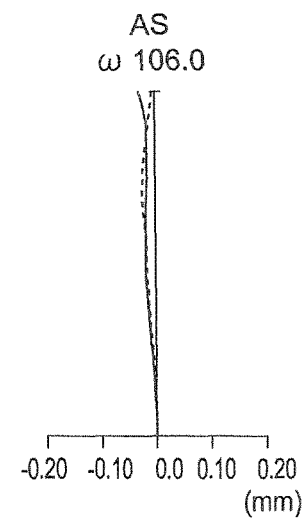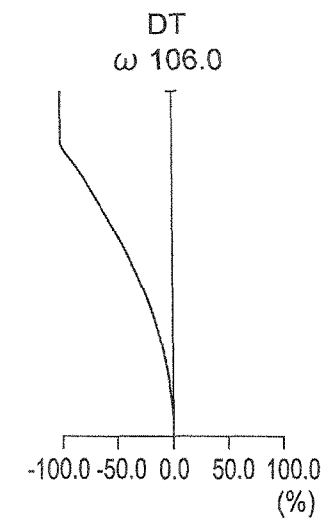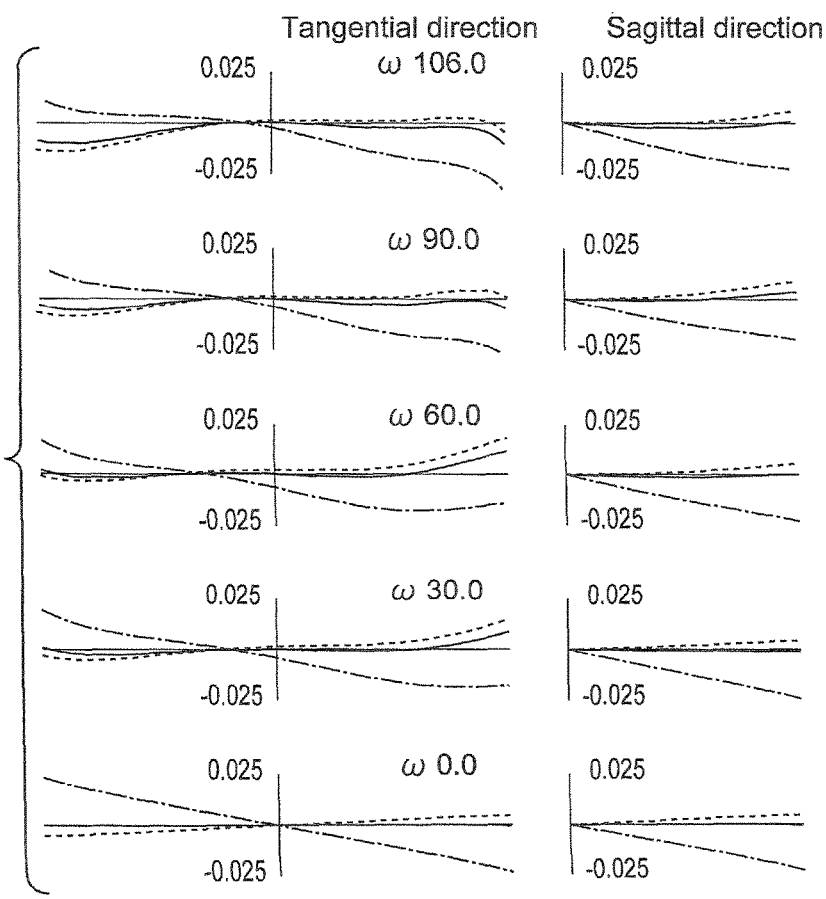

SA
FNO 2.02

AS
ω 106.0

DT
ω 106.0

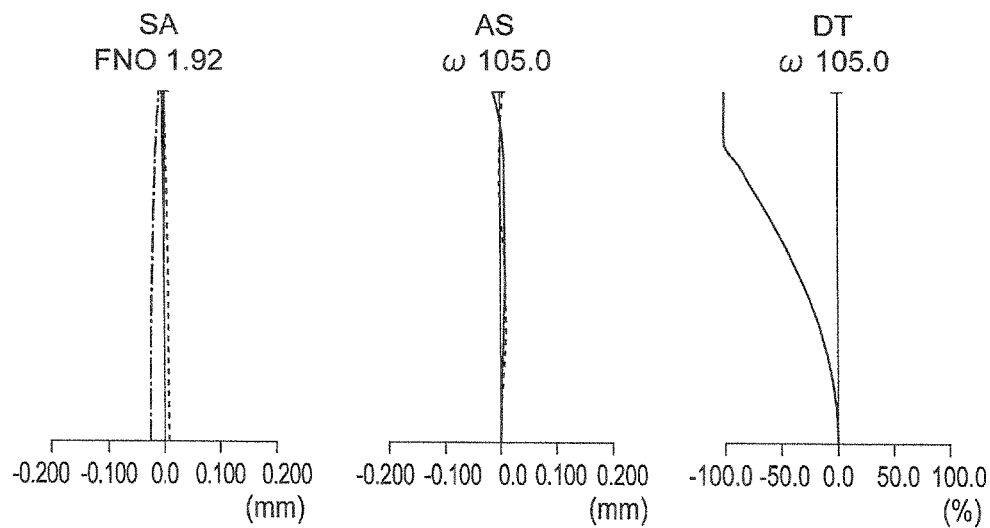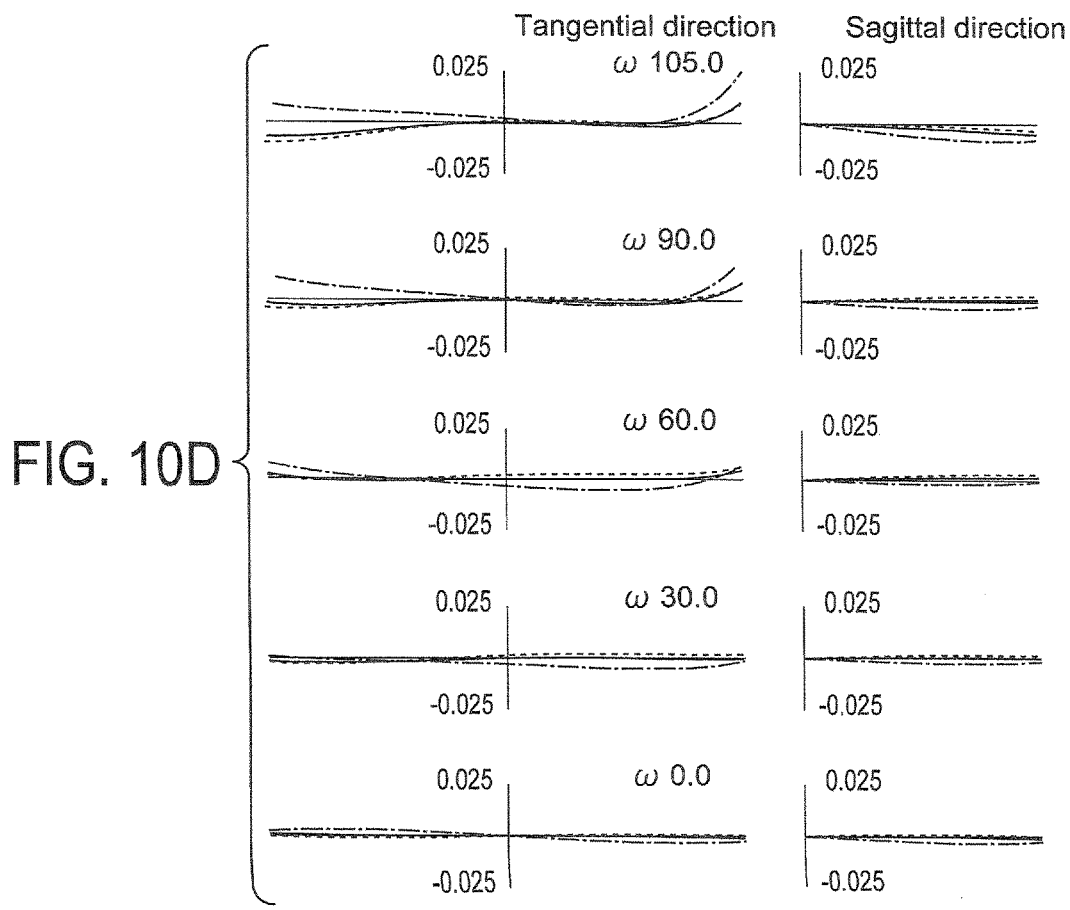

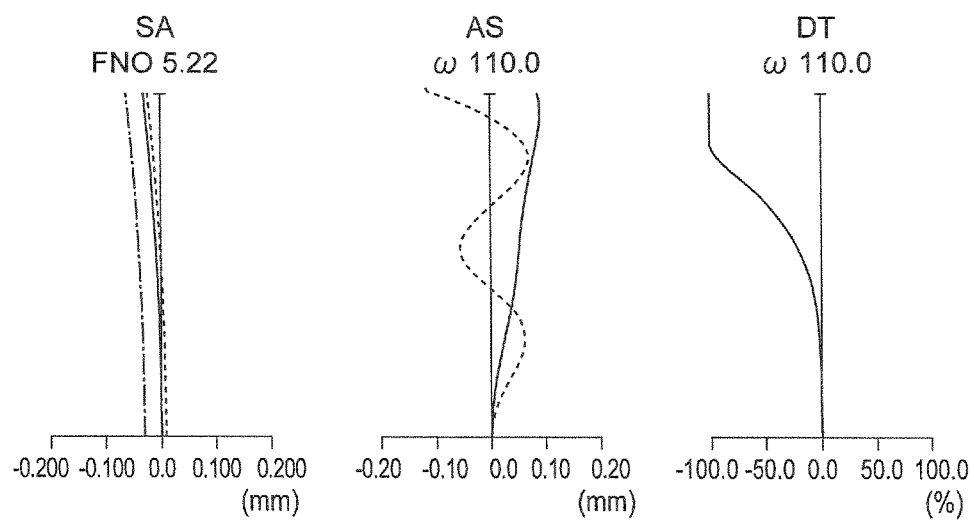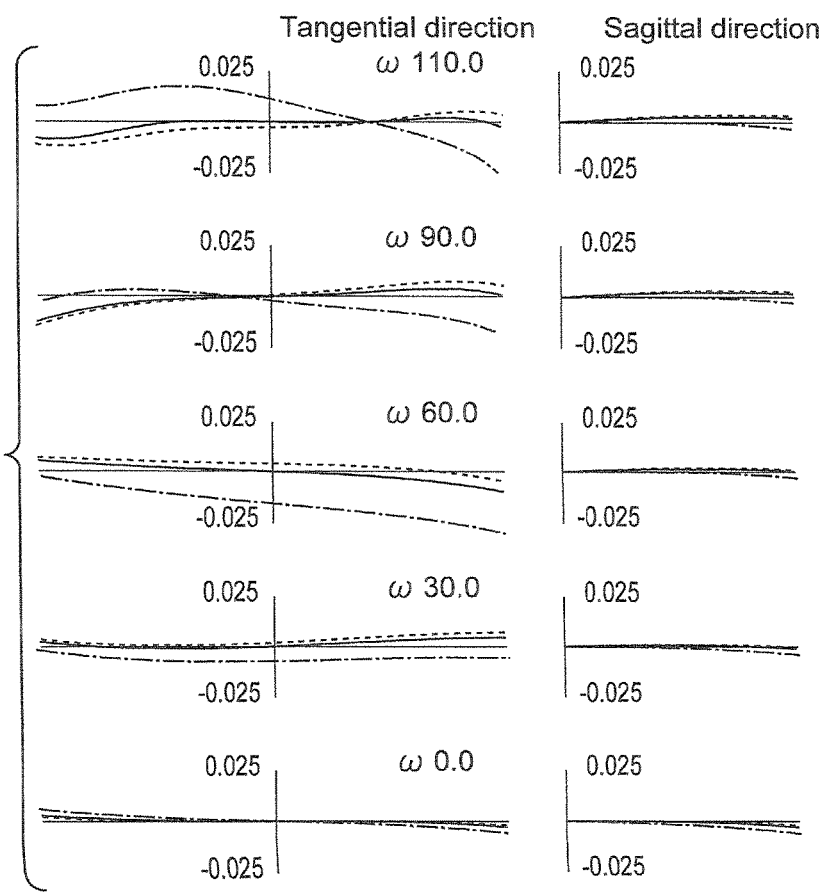

IMAGE PICKUP APPARATUS

CROSS-REFERENCE TO RELATED APPLICATION

The present application is based upon and claims the benefit of priority from the prior Japanese Patent Application No. 2016-194471 filed on Sep. 30, 2016; the entire contents of which are incorporated herein by reference.

BACKGROUND OF THE INVENTION

Field of the Invention

The present invention relates to an image pickup apparatus.

Description of the Related Art

An optical system which has a wide angle of view, and which forms a curved image has been disclosed in International Unexamined Patent Application Publication No. 2016/072336, Japanese Patent Application Laid-open Publication No. 2013-025202, International Unexamined Patent Application Publication No. 2012/090729, and US Unexamined Patent Application Publication No. 2014/0376113.

In International Unexamined Patent Application Publication No. 2016-072336, an optical system which includes four lens components has been disclosed. In Japanese Patent Application Laid-open Publication No. 2013-025202, International Unexamined Patent Application Publication No. 2012/090729, and US Unexamined Patent Application Publication No. 2014/0376113, an optical system which includes a first lens component having a negative refractive power, a second lens component having a positive refractive power, and a third lens component having a refractive power has been disclosed.

SUMMARY OF THE INVENTION

An image pickup apparatus according to at least some of the aspects of the present invention comprises, an image forming optical system which includes an aperture stop which determines an axial light beam, and a plurality of lens components, and an image pickup section which is disposed on an image side of the image forming optical system, and has a light-receiving surface which is not flat but is curved to be concave toward the image forming optical system, wherein the lens component is a lens having only two surfaces in contact with air on an optical axis, which are an object-side surface and an image-side surface, and the image forming optical system includes in order from an object side to the image side, a first lens component having a negative refractive power, a second lens component having a positive refractive power, and a third lens component having a positive refractive power, and in the first lens component, a lens surface on the object side is convex toward the object side, and in a lens surface on the object side of the second lens component, a part of an area is concave toward the object side, and the following conditional expression (1) is satisfied:

$$0.5 < (R1L + R1R)/(R1L - R1R) < 2.5 \quad (1)$$

where,

R1L denotes a paraxial radius of curvature of the lens surface on the object side, of the first lens component, and R1R denotes a paraxial radius of curvature of a lens surface on the image side, of the first lens component.

BRIEF DESCRIPTION OF THE DRAWINGS

FIG. 2A, FIG. 2B, FIG. 2C, and FIG. 2D are aberration diagrams of the image forming optical system according to the example 1;

FIG. 4A, FIG. 4B, FIG. 4C, and FIG. 4D are aberration diagrams of the image forming optical system according to the example 2;

FIG. 6A, FIG. 6B, FIG. 6C, and FIG. 6D are aberration diagrams of the image forming optical system according to the example 3;

FIG. 10A, FIG. 10B, FIG. 10C, and FIG. 10D are aberration diagrams of the image forming optical system according to the example 5;

FIG. 12A, FIG. 12B, FIG. 12C, and FIG. 12D are aberration diagrams of the image forming optical system according to the example 6;

DETAILED DESCRIPTION OF THE INVENTION

Figure 1:
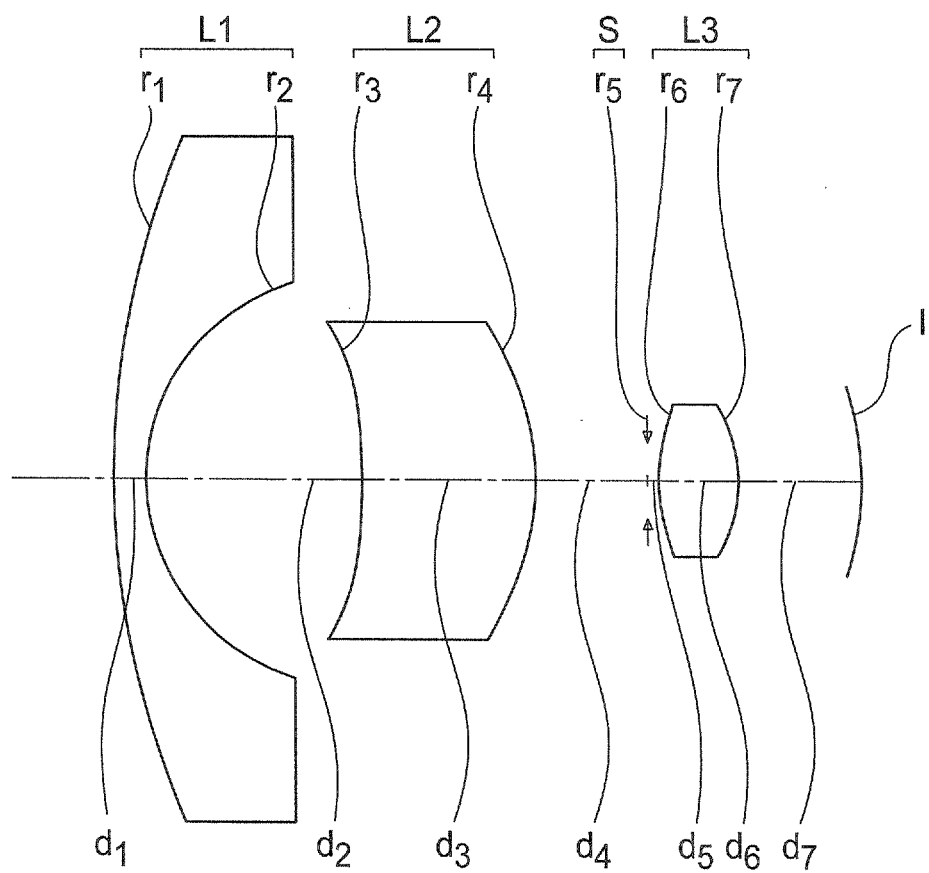
FIG. 1 is a cross-sectional view of an image forming optical system according to an example 1.
Figure 3:
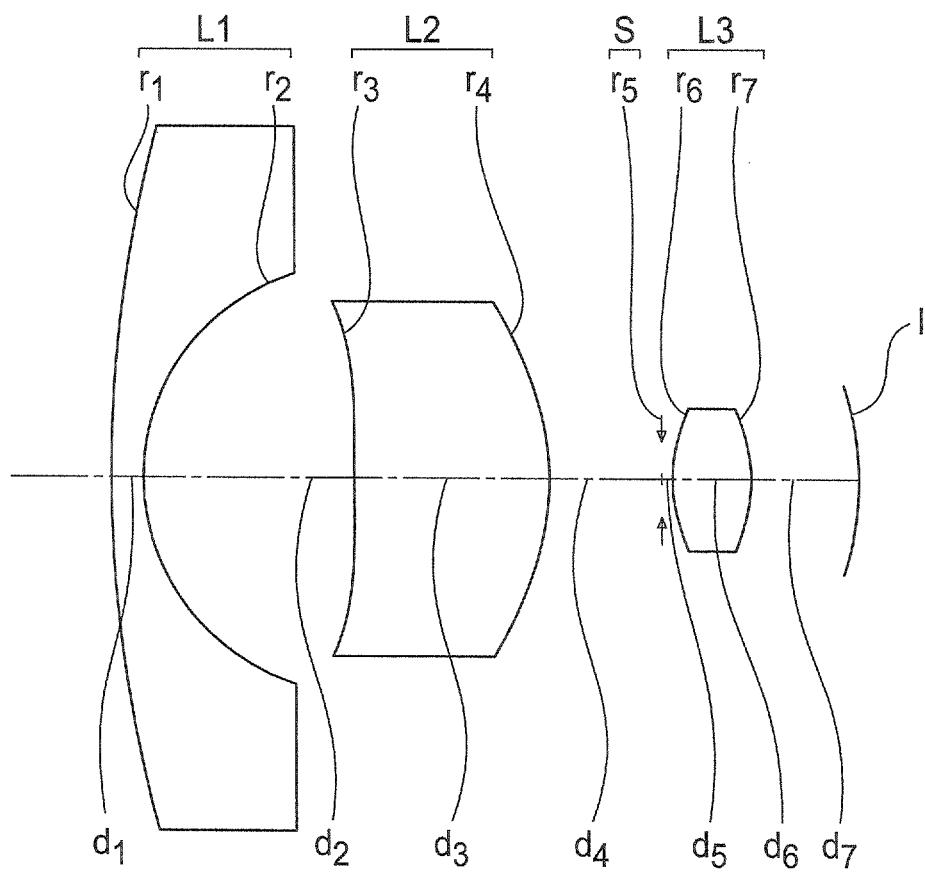
FIG. 3 is a cross-sectional view of an image forming optical system according to an example 2.
Figure 5:
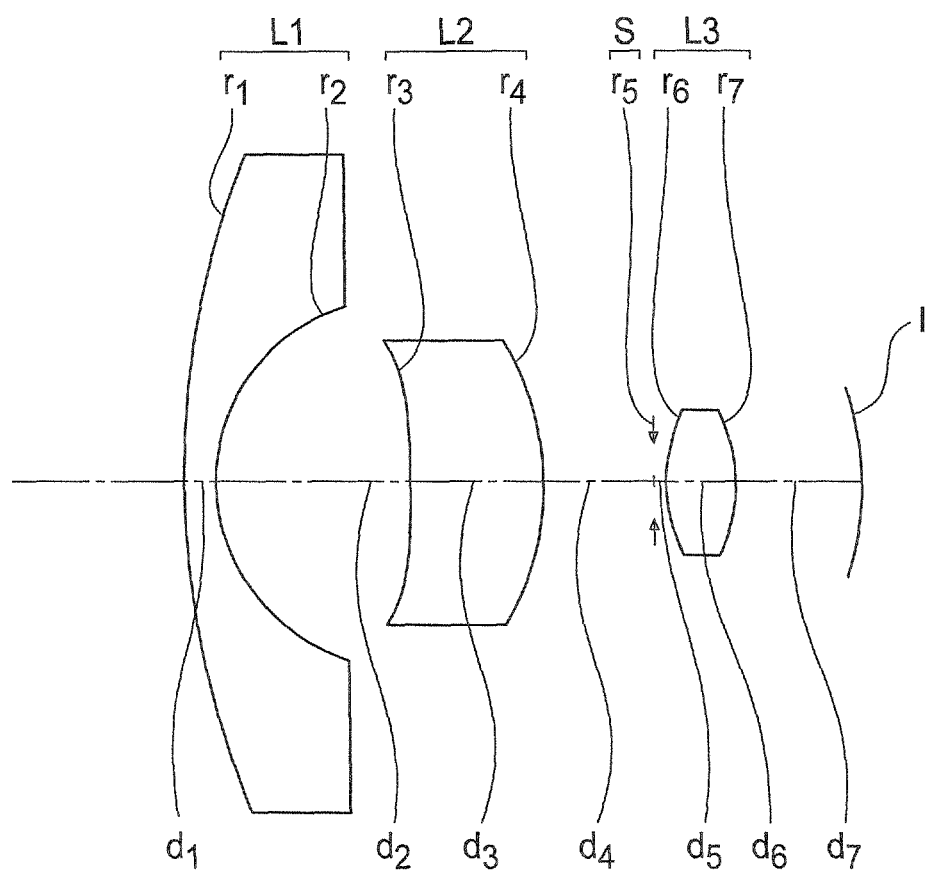
FIG. 5 is a cross-sectional view of an image forming optical system according to an example 3.
Figure 7:
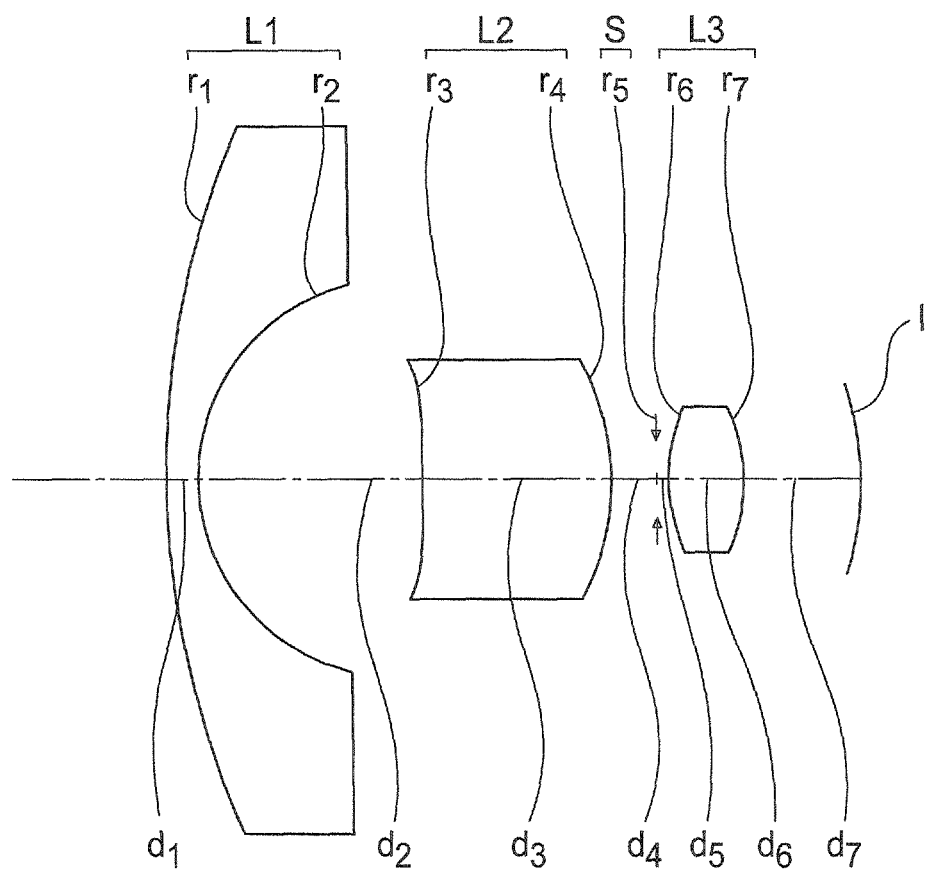
FIG. 7 is a cross-sectional view of an image forming optical system according to an example 4.
Figure 8A:
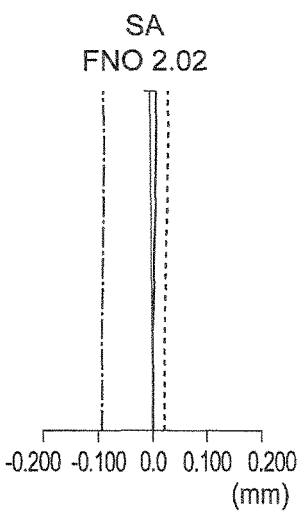
FIG. 8A, FIG. 8B, FIG. 8C, and FIG. 8D are aberration diagrams of the image forming optical system according to the example 4.
Figure 8B:
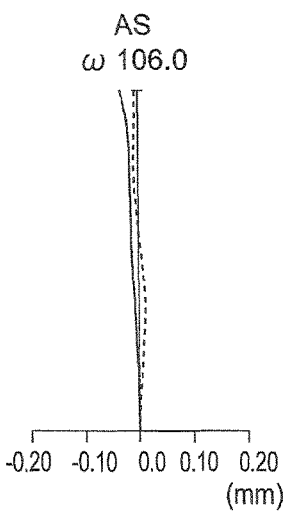
Figure 8C:
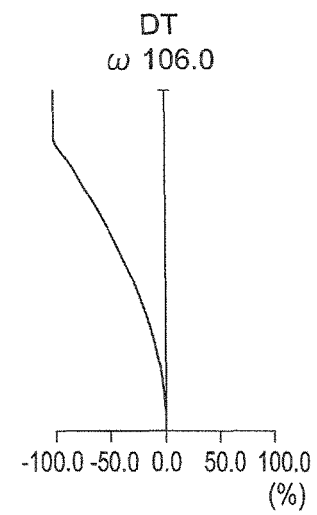
Figure 8D:
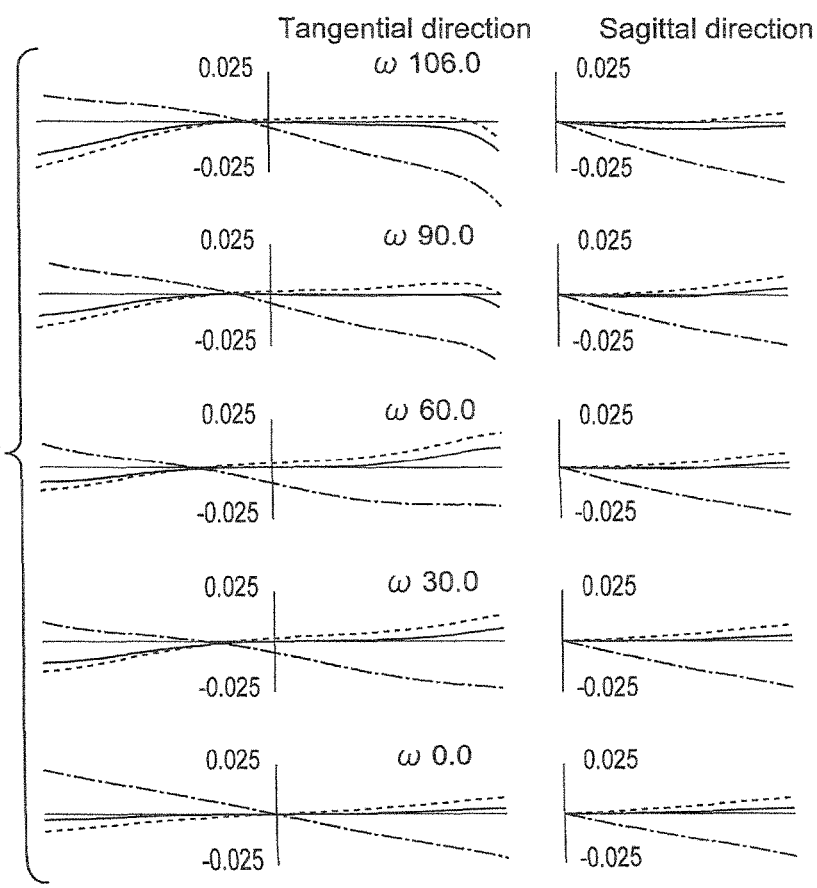
Figure 9:
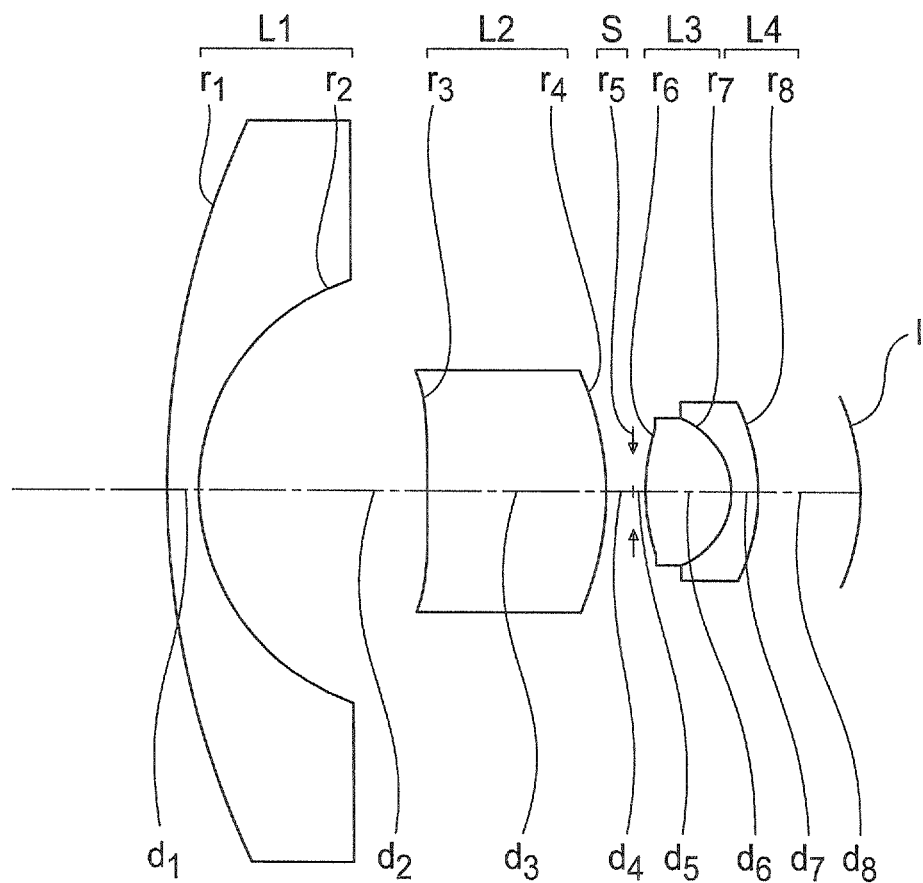
FIG. 9 is a cross-sectional view of an image forming optical system according to an example 5.
Figure 11:
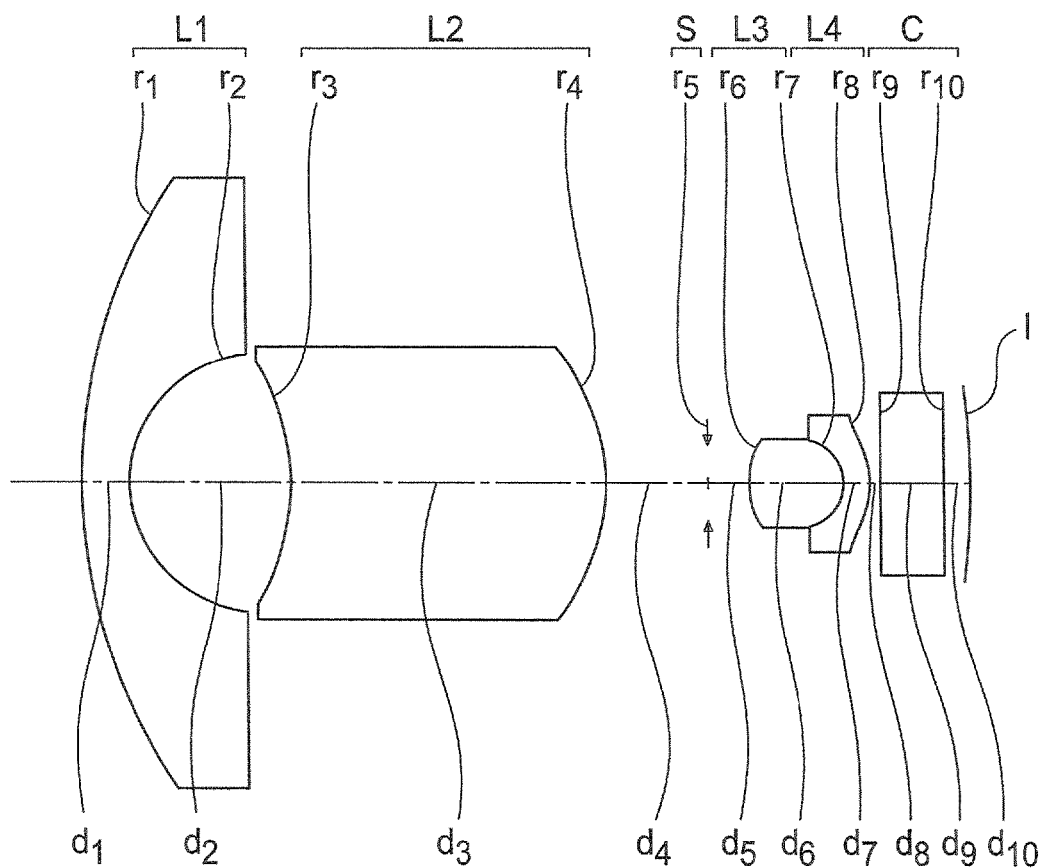
FIG. 11 is a cross-sectional view of an image forming optical system according to an example 6.

Prior to describing the examples, an action and an effect of an embodiment according to certain aspects of the present invention will be described below. For describing specifically the action and the effect of the present embodiment, the description will be made by citing concrete examples. Similar to a case of examples to be described later, the aspects to be exemplified are some of the aspects of the present invention, and there exist a large number of variations of these aspects. Therefore, the present invention is not limited to the aspects that are exemplified.

An image pickup apparatus of the present embodiment includes an image forming optical system which includes an aperture stop which determines an axial light beam, and a plurality of lens components, and an image pickup section which is disposed on an image side of the image forming optical system, and which has a light-receiving surface which is not flat but is curved to be concave toward the image forming optical system, wherein the lens component is a lens having only two surfaces in contact with air on an optical axis, which are an object-side surface and an image-side surface, and the image forming optical system includes in order from an object side to the image side, a first lens component having a negative refractive power, a second lens component having a positive refractive power, and a third lens component having a positive refractive power, and in the first lens component, a lens surface on the object side is convex toward the object side, and in a lens surface on the object side of the second lens component, a part of an area is concave toward the object side, and the following conditional expression (1) is satisfied:

$$0.5<(R1L+R1R)/(R1L-R1R)<2.5 \qquad (1)$$

where,

R1L denotes a paraxial radius of curvature of the lens surface on the object side, of the first lens component, and R1R denotes a paraxial radius of curvature of a lens surface on the image side, of the first lens component.

The image pickup apparatus of the present embodiment, while being small-sized, is capable of photographing a wide photographing range with a high resolution. For this, in the image pickup apparatus of the present embodiment, the image forming optical system to be used in the image pickup apparatus is made to be small-sized and with a wide angle of view, and is made capable of forming a favorable image. A favorable image refers to an optical image in which an aberration from a central portion up to a peripheral portion has been corrected favorably.

In the image pickup apparatus of the present embodiment, the image forming optical system includes the aperture stop and the plurality of lens components. The aperture stop is a stop that determines an axial light beam. The lens component is a lens having only two surfaces in contact with air on the optical axis, which are, the object-side surface and the image-side surface.

As mentioned above, the lens component has the object-side surface and the image-side surface as the surfaces in contact with air. In the following description, the object-side surface out of the two surfaces in contact with air islet to be a lens surface on the object side. The lens surface on the object side is positioned nearest to object in the lens component. Moreover, the image-side surface out of the two surfaces in contact with air is let to be a lens surface on the image side. The lens surface on the image side is positioned nearest to image in the lens component.

The image pickup section is disposed on the image side of the image forming optical system. The image pickup section has the light-receiving surface which is not flat, but is curved to be concave toward the image forming optical system. An image formed on the light-receiving surface is curved to be concave toward the object side.

In an optical system which forms an image which is completely or partially curved to be concave toward the object side (hereinafter, referred to as 'curved image'), an occurrence of a curvature of field to certain extent is acceptable. Therefore, in the optical system which forms a curved image, a load of aberration correction is reduced as compared to a load in an optical system which forms a flat image.

For instance, in an optical system which forms a curved image, it is possible to reduce a lens for correcting Petzval sum. Consequently, it is possible to make the optical system small in size.

Moreover, in an optical system which forms a flat image, for correcting the curvature of field favorably, it is necessary to dispose a lens for correction at a position away from an aperture stop. However, when the lens for correction is disposed, an outer diameter of the optical system becomes large, and furthermore, the number of lens components increases. Thus, the lens for correction is one of the causes that make the outer diameter of the optical system large.

Whereas, in an optical system that forms a curved image, it is not necessary to dispose the lens for correction. Consequently, in an optical system that forms a curved image, it is possible to make the outer diameter of the optical system small.

Moreover, a relative illumination, or in other words, a ratio of an amount of light in a central area to an amount of light in a peripheral area, is suppressed from being degraded. Moreover, further occurrence of distortion is suppressed.

Furthermore, for receiving an image of an optical system by an image pickup element having a curved image pickup surface, the optical system may not be let to be a telecentric optical system for making a light ray incident on the image pickup surface to be almost perpendicular. Consequently, in an optical system that forms a curved image, a degree of freedom of a design in order to achieve both of downsizing and optical performance, is widened.

The image forming optical system in the image pickup apparatus of the present embodiment is also an optical system which forms a curved image. Consequently, it is possible to reduce the number of lens components and to make the optical system small-sized. Furthermore, since the degree of freedom of a design is widened, it is possible to realize an optical system having a high imaging performance while securing a wide angle of view such as 180 degrees or more.

In the image pickup apparatus of the present embodiment, the image forming optical system includes in order from the object side to the image side, the first lens component having a negative refractive power, the second lens component having a positive refractive power, and the third lens component having a positive refractive power. By making such arrangement, it is possible to secure a favorable imaging performance even with a wide angle of view.

The first lens component has a negative refractive power. By making such arrangement, it is possible to secure a favorable imaging performance from a central portion up to a peripheral portion of the photographing range even when the angle of view is 180 degrees or more.

In the first lens component, the lens surface of the object-side surface is convex toward the object side. By making such arrangement, it is possible to make an angle made by a light ray incident on the lens surface on the object side and a normal of the lens surface, small. Consequently, it is possible to suppress an occurrence of various aberrations such as an astigmatism, a distortion, and a coma.

In such manner, the first lens component has a negative refractive power, and the lens surface of the object-side surface is convex toward the object side. Moreover, a shape of the first lens component becomes a meniscus shape.

In the lens surface on the object side of the second lens component, a part of an area is concave toward the object side. By making such arrangement, it is possible to secure a refractive power of appropriate magnitude. Consequently, even with a wide angle of view, it is possible to form a favorable image.

It is preferable that the area which is concave toward the object side be positioned at a peripheral portion of the lens surface. In other words, it is preferable that the lens surface on the object side of the second lens component have a concave portion which is concave toward the object side in a meridional direction, at least in an off-axis effective surface. By making such arrangement, it is possible to form a favorable image even when the angle of view is 180 degrees or more.

Conditional expression (1) is a condition related to a magnitude of the negative refractive power of the first lens component. By satisfying conditional expression (1), it is possible to form a favorable image even when the angle of view is 180 degrees or more.

In a case of exceeding an upper limit value of conditional expression (1), the negative refractive power in the first lens component becomes excessively small. Consequently, when the angle of view becomes 180 degrees or more, it becomes difficult to form a favorable image.

In a case of falling below a lower limit value of conditional expression (1), the negative refractive power in the first lens component becomes excessively large. Consequently, an amount of the astigmatism and an amount of the coma occurring in the first lens component increase.

Moreover, an occurrence of the curvature of field in the overall optical system is suppressed. When the occurrence of the curvature of field is suppressed, an image in that case is flatter as compared to an image in a case in which the negative refractive power is small. In this case, a degree of curve differs largely for the light-receiving surface and the image. Consequently, it becomes difficult to form a favorable image.

It is preferable that the following conditional expression (1-1) be satisfied instead of conditional expression (1).

$$1<(R1L+R1R)/(R1L-R1R)<2 \quad (1\text{-}1)$$

In the image pickup apparatus of the present embodiment, it is preferable that the following conditional expression (2) be satisfied:

$$0 \leq |R1R/R2L| < 0.4 \quad (2)$$

where,

R1R denotes the paraxial radius of curvature of the lens surface on the image side, of the first lens component, and R2L denotes a paraxial radius of curvature of the lens surface on the object side, of the second lens component.

By satisfying conditional expression (2), even when the angle of view is 180 degrees or more, it is possible to form a favorable image.

In a case of exceeding an upper limit value of conditional expression (2), the negative refractive power in the first lens component becomes excessively small. Consequently, when the angle of view becomes 180 degrees or more, it becomes difficult to form a favorable image.

It is more preferable that the following conditional expression (2-1) be satisfied instead of conditional expression (2).

$$0 \leq |R1R/R2L| < 0.3 \quad (2\text{-}1)$$

In the image pickup apparatus of the present embodiment, it is preferable that the lens surface on the object side of the second lens component be an aspherical surface having a point of inflection in an off-axis effective surface on a cross-sectional surface including an optical axis.

By making such arrangement, it is possible to let the sign of the refractive power to be different near the optical axis and at the peripheral portion. As a result, even when the angle of view is 180 degrees or more, it is possible to form a favorable image.

For instance, it is possible to let the refractive power near the optical axis to be a positive refractive power and the refractive power at the peripheral portion to be a negative refractive power. By making such arrangement, it is possible to suppress an occurrence of a spherical aberration near the optical axis, and to secure a wide angle of view at the peripheral portion. As a result, it is possible to form a favorable image even when the angle of view is 180 degrees or more.

In the image pickup apparatus of the present embodiment, it is preferable that the following conditional expression (3) be satisfied:

$$0<R3R/Rimg<1.2 \quad (3)$$

where,

R3R denotes a paraxial radius of curvature of a lens surface on the image side, of the third lens component, and Rimg denotes a radius of curvature of a virtual spherical surface which includes a surface apex and a point in which a principal light ray incident at the maximum angle of view on the image forming optical system intersects a light-receiving surface, letting a point of intersection of the optical axis and the light receiving surface to be the surface apex.

It is preferable to let the lens surface on the image side of the third lens component to be a surface such that a center of curvature is positioned near an exit-pupil position. By making such arrangement, for a principal light ray corresponding to each image height, it is possible to make a radius of curvature in a meridional direction in the lens surface on the image side of the third lens component almost coincide with a radius of curvature in a sagittal direction. As a result, it is possible to suppress an occurrence of astigmatism.

Moreover, it is preferable to make the light-receiving surface to be a surface such that a center of curvature is positioned near a paraxial exit-pupil position. By making such arrangement, a principal light ray corresponding to each image height is incident perpendicularly on the light-receiving surface. As a result, it is possible to suppress an occurrence of shading.

Conditional expression (3) is a condition for suppressing the occurrence of astigmatism and the occurrence of shading. By satisfying conditional expression (3), it is possible to suppress the occurrence of astigmatism and the occurrence of shading.

In a case of exceeding an upper limit value of conditional expression (3), the astigmatism is susceptible to occur. In a case of falling below a lower limit value of conditional expression (3), the shading is susceptible to occur.

It is preferable that the following conditional expression (3-1) be satisfied instead of conditional expression (3).

$$0<R3R/Rimg \leq 1 \quad (3\text{-}1)$$

In the image pickup apparatus of the present embodiment, it is preferable that the following conditional expression (4) be satisfied:

$$0.6<|(Y1 \times 2)/Rimg|<3 \quad (4)$$

where,

Y1 denotes a maximum light-ray height in a predetermined area, here the predetermined area is an area on the lens surface on the object side of the first lens component, through which an effective light beam passes, and Rimg denotes the radius of curvature of the virtual spherical surface which includes the surface apex and the point in which the principal light ray incident at the maximum angle of view on the image forming optical system intersects the light-receiving surface, letting the point of intersection of the optical axis and the light-receiving surface to be the surface apex.

Here, Y1 is a distance from the optical axis, of a point at which an off-axis light ray with the maximum angle of view of the image forming optical system passes through the lens surface on the object side of the first lens component. The distance from the optical axis up to a position of passing of the light ray may be different for an upper light ray and a lower light ray. In this case, Y1 is the maximum distance from the optical axis up to the position of passing of the light ray.

Conditional expression (4) is a condition for downsizing the optical system while maintaining a favorable optical performance. By satisfying conditional expression (4), it is possible to suppress an increase in effective diameter in the first lens component while forming a favorable image, even when the angle of view is 180 degrees or more. By suppressing the increase in the effective diameter, it is possible suppress an increase in a lens diameter.

In a case of exceeding an upper limit value of conditional expression (4), a diameter of the first lens component becomes large. Consequently, it is not possible to achieve downsizing of the optical system.

For downsizing an optical system with a wide angle of view, a diameter of a lens positioned nearest to object for example, is to be made small. In this case, when an entrance pupil is not brought close to the object side, a light ray with a large angle of view does not pass through a pupil of the optical system. For bringing the entrance pupil close to the object side, it is necessary to shorten a focal length of the lens positioned nearest to object.

In the image pickup apparatus of the present embodiment, the first lens component is disposed nearest to object. In a case of falling below a lower limit value of conditional expression (4), the diameter of the first lens component becomes small. In this case, for a light ray with a large angle of view to pass through the pupil of the optical system, a position of the entrance pupil has to be brought close to the object side. Consequently, a focal length of the first lens component becomes short. As a result, various aberrations, particularly, the astigmatism, the distortion, and the coma aberration are susceptible to occur. Thus, in a case of falling below the lower limit value of conditional expression (4), it becomes difficult to form a favorable image.

It is preferable that the following conditional expression (4-1) be satisfied instead of conditional expression (4).

$$1.5 < |(Y1 \times 2)/Rimg| < 3 \tag{4-1}$$

In the image pickup apparatus of the present embodiment, it is preferable that a lens surface which is positioned on the image side of the aperture stop and nearest to the aperture stop be convex toward the object side.

When light that has passed through the aperture stop is refracted in a diverging direction, the spherical aberration and the coma are more susceptible to occur. Therefore, by making the abovementioned arrangement, the light that has passed through the aperture stop is refracted in a converging direction. As a result, it is possible to suppress the occurrence of spherical aberration and the occurrence of coma.

In the image pickup apparatus of the present embodiment, it is preferable that the following conditional expression (5) be satisfied.

$$0.5 < |EXP/Rimg| \leq 1 \tag{5}$$

where,

EXP denotes a distance along the optical axis from the light-receiving surface up to a paraxial exit-pupil position of the image forming optical system, and a sign when the paraxial exit-pupil position is on the object side of the light-receiving surface is let to be negative, and Rimg denotes the radius of curvature of the virtual spherical surface which includes the surface apex and the point in which the principal light ray incident at the maximum angle of view on the image forming optical system intersects the light-receiving surface, letting the point of intersection of the optical axis and the light-receiving surface to be the surface apex.

Conditional expression (5) is a condition for downsizing the optical system and suppressing the occurrence of shading. By satisfying conditional expression (5), it is possible to downsize the optical system and to suppress the occurrence of shading.

When conditional expression (5) is satisfied, it is possible to make the light-receiving surface to be a surface such that a center of curvature of the light-receiving surface is positioned near the paraxial exit-pupil position. When such an arrangement is made, a principal light ray corresponding to each image height is incident perpendicularly on the light-receiving surface. As a result, it is possible to suppress the occurrence of shading.

In a case of exceeding an upper limit value of conditional expression (5), the paraxial exit-pupil position moves away from the light-receiving surface. In this case, the optical system becomes large in size. Moreover, a direction of a light ray incident on the light-receiving surface does not coincide with a direction of a normal of the light-receiving surface. Consequently, shading occurs.

In a case of falling below a lower limit value of conditional expression (5), the direction of a light ray incident on the light-receiving surface does not coincide with the direction of the normal of the light-receiving surface. Consequently, shading occurs.

It is more preferable that the following conditional expression (5-1) be satisfied instead of conditional expression (5).

$$0.55 < |EXP/Rimg| \leq 0.85 \tag{5-1}$$

In the image pickup apparatus of the present embodiment, it is preferable that each of the first lens component, the second lens component, and the third lens component is a single lens.

By making such arrangement, it is possible to form a favorable image even when the angle of view is 180 degrees or more, while downsizing the optical system.

In the image pickup apparatus of the present embodiment, it is preferable that the following conditional expressions (6) and (7) be satisfied:

$$180° \leq 2\omega \leq 230° \tag{6}$$

and $$1.7 \leq Fno \leq 6.0 \tag{7}$$

where,

ω denotes a maximum half angle of view, and

Fno denotes an F-number.

By satisfying conditional expressions (6) and (7), it is possible to make the optical system small-sized while securing a wide angle of view and a small F-number.

It is preferable that the image pickup apparatus of the present embodiment further include an illuminating section, and a cover portion which is disposed on the object side of the image forming optical system.

By disposing the cover portion, it is possible to make an arrangement such that a distance between an object and the image forming optical system is not close excessively, and it is useful for letting the object to be within a depth of field. By including the illuminating section, it becomes useful for night photography and intracavitary photography.

In the image pickup apparatus of the present embodiment, it is preferable that the cover portion be a cover portion having a dome shape covering both of the image forming optical system and the illuminating section.

By making such arrangement, it is possible to make an arrangement such that a distance between the object and the illuminating section is not excessively close, and to reduce an overexposure of a photographic image.

It is preferable that the image pickup apparatus of the present embodiment include the image pickup apparatus, the illuminating section, and the cover portion having a dome shape which is disposed on the object side of the image forming optical system and the illuminating section.

The image pickup apparatus of each embodiment is advantageous for downsizing. Therefore, by providing the illuminating section and the cover portion having a dome shape, it is possible to use the image pickup apparatus as a capsule endoscope.

Examples of the image forming optical system to be used in the image pickup apparatus (hereinafter, referred to as 'image forming optical system') and examples of the image pickup apparatus will be described below by referring to the accompanying diagrams. However, the present invention is not restricted to the examples described below.

FIG. 1, FIG. 3, FIG. 5, FIG. 7, FIG. 9, and FIG. 11 show lens cross-sectional views of the image forming optical system.

FIG. 2A, FIG. 4A, FIG. 6A, FIG. 8A, FIG. 10A, and FIG. 12A show a spherical aberration (SA) of the image forming optical system.

FIG. 2B, FIG. 4B, FIG. 6B, FIG. 8B, FIG. 10B, and FIG. 12B show an astigmatism (AS) of the image forming optical system.

FIG. 2C, FIG. 4C, FIG. 6C, FIG. 8C, FIG. 10C, and FIG. 12C show a distortion (DT) of the image forming optical system.

FIG. 2D, FIG. 4D, FIG. 6D, FIG. 8D, FIG. 10D, and FIG. 12D show a transverse aberration in a tangential direction and a transverse aberration in a sagittal direction, of the image forming optical system.

An upper end of a vertical axis of aberration diagrams of the astigmatism (AS) and the distortion (DT) corresponds to the maximum angle of view. Moreover, the astigmatism (AS) indicates an amount of aberration from the curved light-receiving surface (image pickup surface).

Regarding the distortion, calculation is made by using a stereographic projection method. In the stereographic projection method, an ideal image height Y is indicated by the following expression (A).

$$Y = 2 \times f \times \tan(\omega/2) \quad (A)$$

where,

Y denotes an ideal image height in the stereographic projection method, f denotes a focal length, and ω denotes a half angle of view.

Consequently, it is possible to calculate the distortion from the following expression (B), by using the ideal image height Y and an actual image height y.

$$DT(\%) = (y - Y)/Y \times 100 \quad (B)$$

An image forming optical system according to an example 1 includes in order from an object side, a negative meniscus lens L1 having a convex surface directed toward the object side, a positive meniscus lens L2 having a convex surface directed toward an image side, and a biconvex positive lens L3.

An aperture stop S is disposed between the positive meniscus lens L2 and the biconvex positive lens L3.

An aspherical surface is provided to a total of four surfaces which are, both side-surfaces of the positive meniscus lens L2 and both side-surfaces of the biconvex positive lens L3.

An image forming optical system according to an example 2 includes in order from an object side, a negative meniscus lens L1 having a convex surface directed toward the object side, a biconvex positive lens L2, and a biconvex positive lens L3.

An aperture stop S is disposed between the biconvex positive lens L2 and the biconvex positive lens L3.

An aspherical surface is provided to a total of four surfaces which are, both side-surfaces of the biconvex positive lens L2 and both side-surfaces of the biconvex positive lens L3.

An image forming optical system according to an example 3 includes in order from an object side, a negative meniscus lens L1 having a convex surface directed toward the object side, a positive meniscus lens L2 having a convex surface directed toward an image side, and a biconvex positive lens L3.

An aperture stop S is disposed between the positive meniscus lens L2 and the biconvex positive lens L3.

An aspherical surface is provided to a total of four surfaces which are, both side-surfaces of the positive meniscus lens L2 and both side-surfaces of the biconvex positive lens L3.

An image forming optical system according to an example 4 includes in order from an object side, a negative meniscus lens L1 having a convex surface directed toward the object side, a biconvex positive lens L2, and a biconvex positive lens L3.

An aperture stop S is disposed between the biconvex positive lens L2 and the biconvex positive lens L3.

An aspherical surface is provided to a total of four surfaces which are, both side-surfaces of the biconvex positive lens L2 and both side-surfaces of the biconvex positive lens L3.

An image forming optical system according to an example 5 includes in order from an object side, a negative meniscus lens L1 having a convex surface directed toward the object side, a biconvex positive lens L2, a biconvex positive lens L3, and a negative meniscus lens L4 having a convex surface directed toward an image side. Here, the biconvex positive lens L3 and the negative meniscus lens L4 are cemented.

An aperture stop S is disposed between the biconvex positive lens L2 and the biconvex positive lens L3.

An aspherical surface is provided to a total of three surfaces which are, both side-surfaces of the biconvex positive lens L2 and an object-side surface of the biconvex positive lens L3.

An image forming optical system according to an example 6 includes in order from an object side, a negative meniscus lens L1 having a convex surface directed toward the object side, a positive meniscus lens L2 having a convex surface directed toward an image side, a biconvex positive lens L3, and a negative meniscus lens L4 having a convex surface directed toward the image side. Here, the biconvex positive lens L3 and the negative meniscus lens L4 are cemented.

An aperture stop S is disposed between the positive meniscus lens L2 and the biconvex positive lens L3. A cover glass C is disposed on the image side of the negative meniscus lens L4.

An aspherical surface is provided to a total of four surfaces which are, both side-surfaces of the positive meniscus lens L2, an object-side surface of the biconvex positive lens L3, and an image-side surface of the negative meniscus lens L4.

Figure 13:
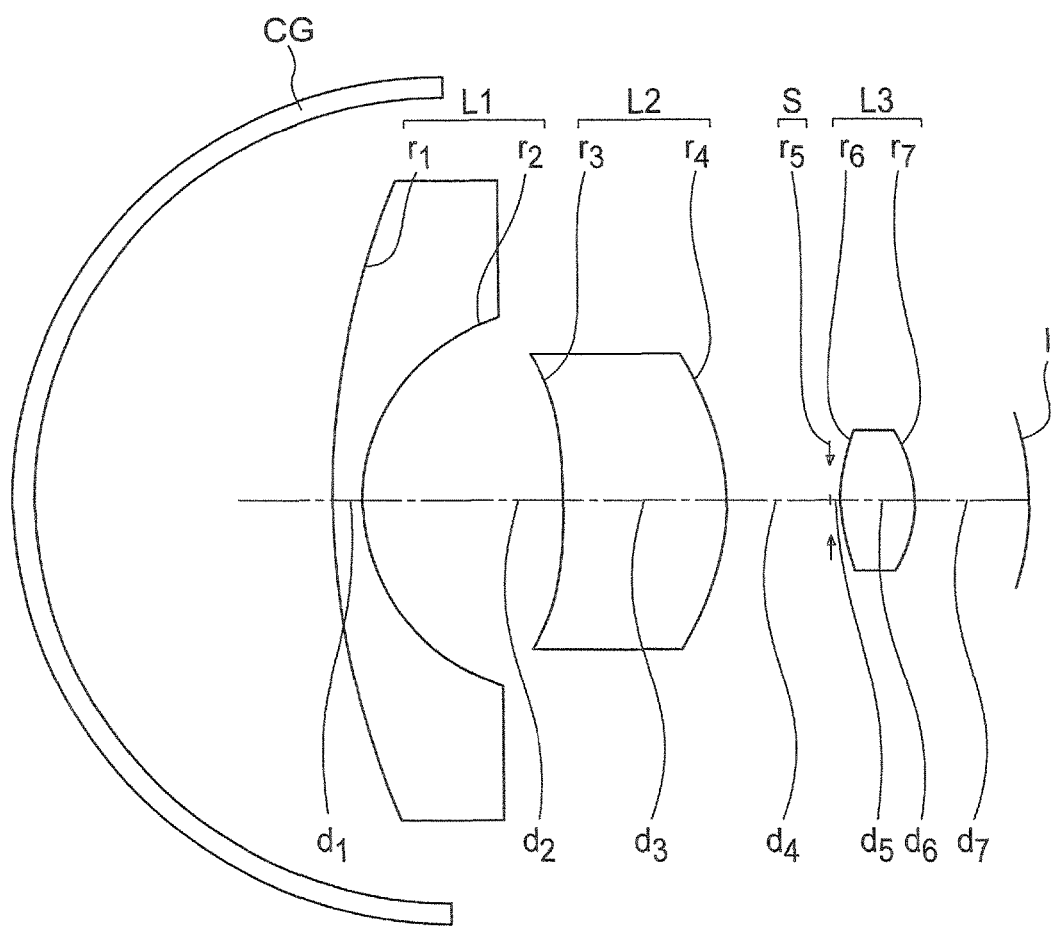
FIG. 13 is a cross-sectional view of an image forming optical system according to an example 7.

An image forming optical system according to an example 7, as shown in FIG. 13, includes in order from an object side, an optical member CG, a negative meniscus lens L1 having a convex surface directed toward the object side, a positive meniscus lens L2 having a convex surface directed toward an image side, and a biconvex positive lens L3. The optical system including the negative meniscus lens L1, the positive meniscus lens L2, an aperture stop S, and the biconvex positive lens L3 is same as the optical system according to the example 1.

FIG. 13 is a schematic diagram illustrating that the optical member CG can be disposed. Therefore, a size and a position of the optical member CG have not been depicted accurately with respect to sizes and positions of the lenses.

The optical member CG is a member in the form of a plate, and both an object-side surface and an image-side surface thereof are curved surfaces. In FIG. 13, both the object-side surface and the image-side surface being curved surfaces, an overall shape of the optical member CG is hemispherical. In the example 7, a thickness of the optical member CG, or in other words, a distance between the object-side surface and the image-side surface, is constant. However, the thickness of the optical member CG may not be constant.

Moreover, as it will be described later, the optical member CG is disposed at a position only 6.0 mm away on the object side from the object-side surface of the first lens. However, the optical member CG may be disposed at a position shifted frontward or rearward from the abovementioned position. Moreover, a radius of curvature and the thickness of the optical member CG mentioned here is an example, and are not limited to the radius of curvature and the thickness mentioned here.

A material that allows light to transmit through has been used for the optical member CG. Consequently, light from an object passes through the optical member CG and is incident on the negative meniscus lens L1. The optical member CG is disposed such that a curvature center of the image-side surface substantially coincides with a position of an entrance pupil. Consequently, a new aberration due to the optical member CG hardly occurs. In other words, an imaging performance of the image forming optical system according to the example 7 is not different from an imaging performance of the image forming optical system according to the example 1.

The optical member CG functions as a cover glass. In this case, the optical member CG corresponds to an observation window provided at an outer covering of a capsule endoscope. Therefore, the image forming optical system according to the example 7 can be used for an optical system of a capsule endoscope. The image forming optical systems according to the example 1 to the example 6 can also be used for an optical system of an endoscope.

Numerical data of each example described above is shown below. In Surface data, r denotes radius of curvature of each lens surface, d denotes a distance between respective lens surfaces, nd denotes a refractive index of each lens for a d-line, vd denotes an Abbe number for each lens, * denotes an aspherical surface, and stop denotes an aperture stop.

Further, in Various data, f denotes a focal length of the entire system, FNO. denotes an F number, ω denotes a half angle of view, IH denotes an image height, BF denotes a back focus, LTL denotes a lens total length of the optical system. Further, back focus is a distance which is expressed upon air conversion of a distance from a rearmost lens surface to a paraxial image surface. The lens total length is a distance from a frontmost lens surface to the rearmost lens surface plus back focus.

Moreover, the example 7 is an example in which, the optical member CG is disposed on the object side of the image forming optical system according to the example 1. In surface data of the example 7, C1 denotes the object-side surface of the optical member CG and C2 denotes the image-side surface of the optical member CG. Aspherical surface data and various data of the example 7 being same as the aspherical surface data and various data of the example 1, description thereof is omitted here.

A shape of an aspherical surface is defined by the following expression where the direction of the optical axis is represented by z, the direction orthogonal to the optical axis is represented by y, a conical coefficient is represented by K, aspherical surface coefficients are represented by A4, A6, A8, A10, A12 . . .

$$Z=(y^2/r)/[1+\{1-(1+k)(y/r)^2\}^{1/2}]+A4\ y^4+A6\ y^6+A8\ y^8+A10\ y^{10}+A12\ y^{12}+\ldots$$

Further, in the aspherical surface coefficients, 'e-n' (where, n is an integral number) indicates '$10^{-n}$'. Moreover, these symbols are commonly used in the following numerical data for each example.

EXAMPLE 1

| Unit mm | | | | |
|---|---|---|---|---|
| Surface data | | | | |
| Surface no. | r | d | nd | vd |
| Object plane | ∞ | ∞ | | |
| 1 | 17.000 | 0.60 | 1.72916 | 54.68 |
| 2 | 3.989 | 4.04 | | |
| 3* | −17.043 | 3.28 | 1.61441 | 25.11 |
| 4* | −4.777 | 2.08 | | |
| 5(Stop) | ∞ | 0.20 | | |
| 6* | 3.147 | 1.48 | 1.52550 | 55.20 |
| 7* | −2.835 | 2.31 | | |
| Image plane | −6.000 | | | |

Aspherical surface data

3rd surface k = 0.000
A4 = −5.27579e−03, A6 = 1.02482e−04

4th surface k = 0.000
A4 = 2.03599e−03

6th surface k = 0.000
A4 = −1.79617e−02

7th surface k = 0.000
A4 = −2.69500e−03, A6 = 6.38861e−03, A8 = −2.51890e−03

| Various data | |
|---|---|
| f | 1.59 |
| FNO. | 2.02 |
| 2ω | 182.00 |
| IH | 1.81 |

-continued

| Unit mm | |
|---|---|
| BF (in air) | 2.32 |
| LTL (in air) | 14.02 |

EXAMPLE 2

| Unit mm | | | | |
|---|---|---|---|---|
| Surface data | | | | |
| Surface no. | r | d | nd | vd |
| Object plane | ∞ | ∞ | | |
| 1 | 26.130 | 0.60 | 1.72916 | 54.68 |
| 2 | 4.157 | 3.95 | | |
| 3* | 100.000 | 3.67 | 1.61441 | 25.11 |
| 4* | −5.008 | 2.10 | | |
| 5(Stop) | ∞ | 0.20 | | |
| 6* | 2.804 | 1.47 | 1.52550 | 55.20 |
| 7* | −3.019 | 2.01 | | |
| Image plane | −6.000 | | | |

Aspherical surface data

3rd surface k = 0.000
A4 = −4.48810e−03, A6 = 8.68982e−05
4th surface k = 0.000
A4 = 2.16722e−03
6th surface k = 0.000
A4 = −1.48228e−02
7th surface k = 0.000
A4 = −2.36920e−03, A6 = 1.16229e−02, A8 = −3.17096e−03

| Various data | |
|---|---|
| f | 1.60 |
| FNO. | 1.98 |
| 2ω | 182.00 |
| IH | 1.81 |
| BF (in air) | 2.03 |
| LTL (in air) | 14.02 |

EXAMPLE 3

| Unit mm | | | | |
|---|---|---|---|---|
| Surface data | | | | |
| Surface no. | r | d | nd | vd |
| Object plane | ∞ | ∞ | | |
| 1 | 17.000 | 0.60 | 1.72916 | 54.68 |
| 2 | 3.572 | 3.65 | | |
| 3* | −37.653 | 2.50 | 1.61441 | 25.11 |
| 4* | −5.482 | 2.05 | | |
| 5(Stop) | ∞ | 0.23 | | |
| 6* | 2.705 | 1.30 | 1.52550 | 55.20 |
| 7* | −3.106 | 2.36 | | |
| Image plane | −6.000 | | | |

-continued

| Unit mm |
|---|
| Aspherical surface data |

3rd surface k = 0.000
A4 = −6.12859e−03, A6 = −9.47285e−05
4th surface k = 0.000
A4 = −1.93646e−04
6th surface k = 0.000
A4 = −1.85874e−02
7th surface k = 0.000
A4 = −1.21740e−03, A6 = 7.08245e−03, A8 = −2.62091e−03

| Various data | |
|---|---|
| f | 1.60 |
| FNO. | 2.03 |
| 2ω | 212.00 |
| IH | 1.80 |
| BF (in air) | 2.36 |
| LTL (in air) | 12.69 |

EXAMPLE 4

| Unit mm | | | | |
|---|---|---|---|---|
| Surface data | | | | |
| Surface no. | r | d | nd | vd |
| Object plane | ∞ | ∞ | | |
| 1 | 17.000 | 0.60 | 1.72916 | 54.68 |
| 2 | 3.861 | 4.20 | | |
| 3* | 100.000 | 3.54 | 1.61441 | 25.11 |
| 4* | −4.832 | 0.84 | | |
| 5(Stop) | ∞ | 0.23 | | |
| 6* | 2.957 | 1.40 | 1.52550 | 55.20 |
| 7* | −3.507 | 2.19 | | |
| Image plane | −6.000 | | | |

Aspherical surface data

3rd surface k = 0.000
A4 = −8.79504e−03, A6 = −2.53082e−04, A8 = 5.99797e−06
4th surface k = 0.000
A4 = 4.91152e−04
6th surface k = 0.000
A4 = −1.47147e−02
7th surface k = 0.000
A4 = −4.28159e−03, A6 = 5.65197e−03, A8 = −2.36983e−03

| Various data | |
|---|---|
| f | 1.60 |
| FNO. | 2.02 |
| 2ω | 212.00 |
| IH | 1.81 |
| BF (in air) | 2.20 |
| LTL (in air) | 13.02 |

EXAMPLE 5

Unit mm

Surface data

| Surface no. | r | d | nd | vd |
|---|---|---|---|---|
| Object plane | ∞ | ∞ | | |
| 1 | 17.000 | 0.60 | 1.72916 | 54.68 |
| 2 | 4.314 | 4.28 | | |
| 3* | 100.000 | 3.37 | 1.61441 | 25.11 |
| 4* | −5.369 | 0.50 | | |
| 5(Stop) | ∞ | 0.23 | | |
| 6* | 3.823 | 1.60 | 1.80625 | 40.91 |
| 7 | −1.512 | 0.50 | 1.92286 | 18.90 |
| 8 | −3.926 | 1.92 | | |
| Image plane | −4.500 | | | |

Aspherical surface data

3rd surface k = 0.000
A4 = −8.20560e−03, A6 = −1.57519e−04, A8 = 2.06857e−05

4th surface k = 0.000
A4 = 1.12963e−03

6th surface k = 0.000
A4 = −1.81291e−03

Various data

| f | 1.59 |
|---|---|
| FNO. | 1.92 |
| 2ω | 210.00 |
| IH | 1.80 |
| BF (in air) | 1.93 |
| LTL (in air) | 13.01 |

EXAMPLE 6

Unit mm

Surface data

| Surface no. | r | d | nd | vd |
|---|---|---|---|---|
| Object plane | ∞ | ∞ | | |
| 1 | 10.817 | 0.90 | 1.88300 | 40.76 |
| 2 | 2.522 | 3.07 | | |
| 3* | −3.438 | 6.00 | 1.80625 | 40.91 |
| 4* | −3.697 | 1.93 | | |
| 5(Stop) | ∞ | 0.78 | | |
| 6* | 2.067 | 1.79 | 1.49700 | 81.54 |
| 7 | −0.860 | 0.50 | 1.80625 | 40.91 |
| 8* | −1.438 | 0.20 | | |
| 9 | ∞ | 1.20 | 1.51633 | 64.14 |
| 10 | ∞ | 0.50 | | |
| Image plane | −15.000 | | | |

Aspherical surface data

3rd surface k = 0.000
A4 = 2.60187e−02, A6 = −5.07766e−03, A8 = 3.76355e−04

4th surface k = −8.856
A4 = −1.61910e−02, A6 = 2.66712e−03, A8 = −1.96497e−04

6th surface k = 0.000
A4 = 8.72028e−02, A6 = −1.45021e−03, A8 = 5.65187e−02

8th surface k = −0.613
A4 = 1.20896e−01, A6 = −5.03443e−02, A8 = 1.92782e−02

Various data

| f | 0.70 |
|---|---|
| FNO. | 5.22 |
| 2ω | 220.00 |
| IH | 1.89 |
| BF (in air) | 1.50 |
| LTL (in air) | 16.48 |

EXAMPLE 7

Unit mm

Surface data

| Surface no. | r | d | nd | vd |
|---|---|---|---|---|
| Object plane | ∞ | ∞ | | |
| C1 | 8.500 | 0.50 | 1.5896 | 30.00 |
| C2 | 8.000 | 6.00 | | |
| 1 | 17.000 | 0.60 | 1.72916 | 54.68 |
| 2 | 3.989 | 4.04 | | |
| 3* | −17.043 | 3.28 | 1.61441 | 25.11 |
| 4* | −4.777 | 2.08 | | |
| 5(Stop) | ∞ | 0.20 | | |
| 6* | 3.147 | 1.48 | 1.52550 | 55.20 |
| 7* | −2.835 | 2.31 | | |
| Image plane | −6.000 | | | |

An amount of distortion calculated by using the stereographic projection method is shown below.

EXAMPLE 1

TABLE 1

| ω [°] | y [mm] | Y [mm] | DT [%] |
|---|---|---|---|
| 0 | 0.00 | 0.00 | 0.0 |
| 10 | 0.28 | 0.28 | −1.2 |
| 20 | 0.54 | 0.56 | −3.2 |
| 30 | 0.80 | 0.85 | −6.4 |
| 40 | 1.04 | 1.16 | −10.7 |
| 50 | 1.25 | 1.49 | −15.9 |
| 60 | 1.44 | 1.84 | −21.9 |
| 70 | 1.60 | 2.23 | −28.6 |
| 80 | 1.71 | 2.68 | −35.9 |
| 91 | 1.81 | 3.25 | −44.3 |

EXAMPLE 2

TABLE 2

| ω [°] | y [mm] | Y [mm] | DT [%] |
|---|---|---|---|
| 0 | 0.00 | 0.00 | 0.0 |
| 10 | 0.28 | 0.28 | −1.3 |

TABLE 2-continued

| ω [°] | y [mm] | Y [mm] | DT [%] |
|---|---|---|---|
| 20 | 0.54 | 0.56 | −3.5 |
| 30 | 0.80 | 0.86 | −7.0 |
| 40 | 1.03 | 1.16 | −11.4 |
| 50 | 1.24 | 1.49 | −16.7 |
| 60 | 1.43 | 1.84 | −22.5 |
| 70 | 1.59 | 2.24 | −29.1 |
| 80 | 1.71 | 2.68 | −36.2 |
| 91 | 1.81 | 3.25 | −44.3 |

EXAMPLE 3

TABLE 3

| ω [°] | y [mm] | Y [mm] | DT [%] |
|---|---|---|---|
| 0 | 0.00 | 0.00 | 0.0 |
| 10 | 0.28 | 0.28 | −0.7 |
| 20 | 0.55 | 0.56 | −2.6 |
| 30 | 0.81 | 0.86 | −5.9 |
| 40 | 1.04 | 1.16 | −10.3 |
| 50 | 1.26 | 1.49 | −15.8 |
| 60 | 1.44 | 1.85 | −22.2 |
| 70 | 1.58 | 2.24 | −29.5 |
| 80 | 1.69 | 2.69 | −37.2 |
| 90 | 1.75 | 3.20 | −45.2 |
| 100 | 1.79 | 3.81 | −53.0 |
| 106 | 1.80 | 4.25 | −57.6 |

EXAMPLE 4

TABLE 4

| ω [°] | y [mm] | Y [mm] | DT [%] |
|---|---|---|---|
| 0 | 0.00 | 0.00 | 0.0 |
| 10 | 0.28 | 0.28 | −1.3 |
| 20 | 0.54 | 0.56 | −3.5 |
| 30 | 0.80 | 0.86 | −6.9 |
| 40 | 1.03 | 1.16 | −11.4 |
| 50 | 1.23 | 1.49 | −17.0 |
| 60 | 1.41 | 1.84 | −23.5 |
| 70 | 1.55 | 2.24 | −30.5 |
| 80 | 1.66 | 2.68 | −38.0 |
| 90 | 1.74 | 3.19 | −45.5 |
| 100 | 1.79 | 3.80 | −53.1 |
| 106 | 1.81 | 4.24 | −57.3 |

EXAMPLE 5

TABLE 5

| ω [°] | y [mm] | Y [mm] | DT [%] |
|---|---|---|---|
| 0 | 0.00 | 0.00 | 0.0 |
| 10 | 0.28 | 0.28 | −1.0 |
| 20 | 0.55 | 0.56 | −3.1 |
| 30 | 0.80 | 0.85 | −6.5 |
| 40 | 1.03 | 1.16 | −11.1 |
| 50 | 1.24 | 1.49 | −16.8 |
| 60 | 1.41 | 1.84 | −23.3 |
| 70 | 1.55 | 2.23 | −30.4 |
| 80 | 1.66 | 2.68 | −37.9 |
| 90 | 1.74 | 3.19 | −45.5 |
| 100 | 1.78 | 3.80 | −53.1 |
| 106 | 1.80 | 4.23 | −57.5 |

EXAMPLE 6

TABLE 6

| ω [°] | y [mm] | Y [mm] | DT [%] |
|---|---|---|---|
| 0 | 0.00 | 0.00 | 0.0 |
| 10 | 0.12 | 0.12 | 0.2 |
| 20 | 0.25 | 0.25 | 2.2 |
| 30 | 0.40 | 0.38 | 5.3 |
| 40 | 0.56 | 0.51 | 9.5 |
| 50 | 0.75 | 0.66 | 14.1 |
| 60 | 0.95 | 0.81 | 17.6 |
| 70 | 1.17 | 0.98 | 18.4 |
| 80 | 1.37 | 1.18 | 16.2 |
| 90 | 1.57 | 1.41 | 11.4 |
| 100 | 1.75 | 1.68 | 4.2 |
| 110 | 1.89 | 2.01 | −5.9 |

Next, values of conditional expressions in each example are given below.

| | Example1 | Example2 | Example3 |
|---|---|---|---|
| (1)(R1L + R1R)/(R1L − R1R) | 1.613 | 1.378 | 1.532 |
| (2)|R1R/R2L| | 0.234 | 0.042 | 0.095 |
| (3)R3R/Rimg | 0.473 | 0.503 | 0.518 |
| (4)|(Y1 × 2)/Rimg| | 2.015 | 1.988 | 1.968 |
| (5)|EXP/Rimg| | 0.639 | 0.583 | 0.616 |
| (6)2ω | 182.00 | 182.00 | 212.00 |
| (7)Fno | 2.02 | 1.98 | 2.03 |

| | Example4 | Example5 | Example6 |
|---|---|---|---|
| (1)(R1L + R1R)/(R1L − R1R) | 1.588 | 1.680 | 1.608 |
| (2)|R1R/R2L| | 0.039 | 0.043 | 0.734 |
| (3)R3R/Rimg | 0.585 | 0.872 | 0.096 |
| (4)|(Y1 × 2)/Rimg| | 2.101 | 2.927 | 0.698 |
| (5)|EXP/Rimg| | 0.600 | 0.841 | 0.710 |
| (6)2ω | 212.00 | 210.00 | 220.00 |
| (7)Fno | 2.02 | 1.92 | 5.22 |

Figure 14:
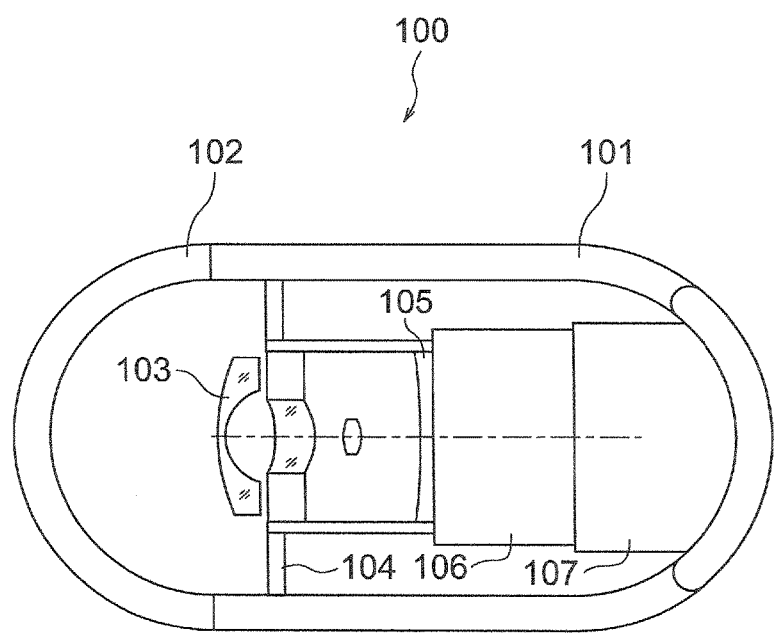
FIG. 14 is a diagram showing a schematic arrangement of a capsule endoscope.

FIG. 14 illustrates an example of an image pickup apparatus. In this example, the image pickup apparatus is a capsule endoscope. A capsule endoscope 100 includes a capsule cover 101 and a transparent cover 102. An outer covering of the capsule endoscope 100 is formed by the capsule cover 101 and the transparent cover 102.

The capsule cover 101 includes a central portion having a substantially circular cylindrical shape, and a bottom portion having a substantially bowl shape. The transparent cover 102 is disposed at a position facing the bottom portion, across the central portion. The transparent cover 102 is formed by a transparent member having a substantially bowl shape. The capsule cover 101 and the transparent cover 102 are connected consecutively to be mutually watertight.

An interior of the capsule endoscope 100 includes an image forming optical system 103, a illumination unit 104, an image pickup element 105, a drive control unit 106, and a signal processing unit 107. Although it is not shown in the diagram, the interior of the capsule endoscope 100 is provided with an electric-power receiving unit and a transmitting unit.

Illumination light is irradiated from the illumination unit 104. The illumination light passes through the transparent cover 102 and is irradiated to an object. Light from the object is incident on the image forming optical system 103. An optical image of the object is formed at an image position by the image forming optical system 103.

The optical image is picked up by the image pickup element 105. A drive and control of the image pickup element 105 is carried out by the drive control unit 106. Moreover, an output signal from the image pickup element 105 is processed by the signal processing unit 107 according to the requirement.

Here, for the image forming optical system 103, the image forming optical system according to the abovementioned example 1 for instance, is used. In such manner, the image forming optical system 103 has a wide angle of view and a small F-number, while being small-sized. Consequently, in the image forming optical system 103, a wide-angle optical image having a high resolution is acquired.

Moreover, the capsule endoscope 100 includes an optical system having a wide angle of view and a small F-number while, being small-sized. Consequently, in the capsule endoscope 100, it is possible to acquire a wide-angle image with high resolution, while being small-sized.

Figure 15A:
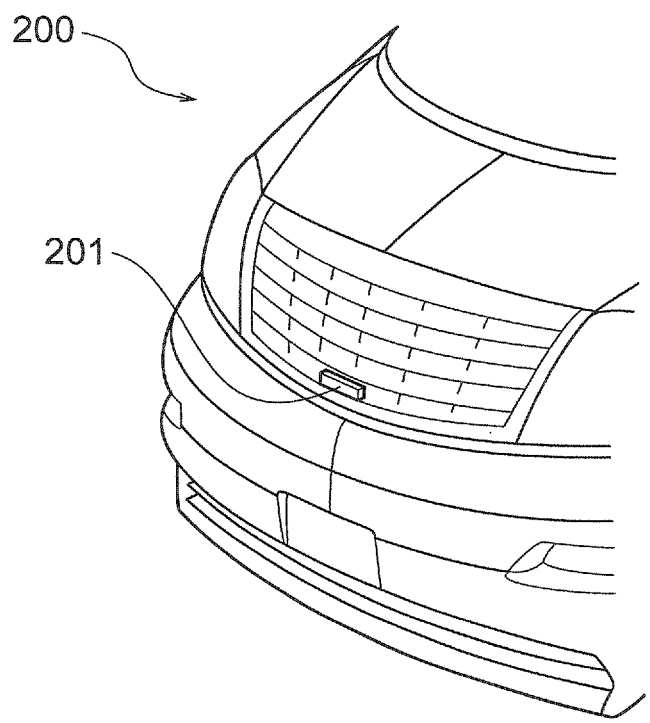
FIG. 15A and FIG. 15B are diagrams showing a car-mounted camera.
Figure 15B:
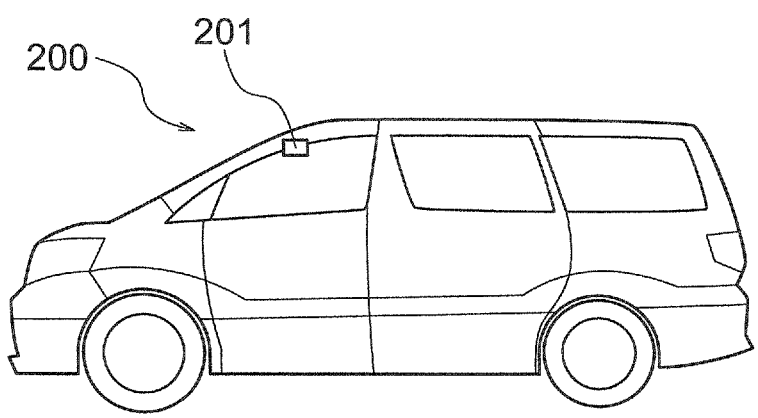

FIG. 15A and FIG. 15B are diagrams illustrating another example of an image pickup apparatus. In this example, the image pickup apparatus is a car-mounted camera. FIG. 15A is a diagram illustrating an example of a car-mounted camera mounted at an outside of a car, and FIG. 15B is a diagram illustrating an example of a car-mounted camera mounted inside a car.

As shown in FIG. 15A, a car-mounted camera 201 is provided to a front grill of an automobile 200. The car-mounted camera 201 includes an image forming optical system and an image pickup element. For the image forming optical system of the car-mounted camera 201, the image forming optical system according to the abovementioned example 1 is used. Consequently, an optical image of an extremely wide range (the angle of view of about 220°) is formed.

As shown in FIG. 15B, the car-mounted camera 201 is provided near a ceiling of the automobile 200. An action and an effect of the car-mounted camera 201 are as have already been described. In the car-mounted camera 201, it is possible to acquire a wide-angle image with high resolution, while being small-sized.

Figure 16:
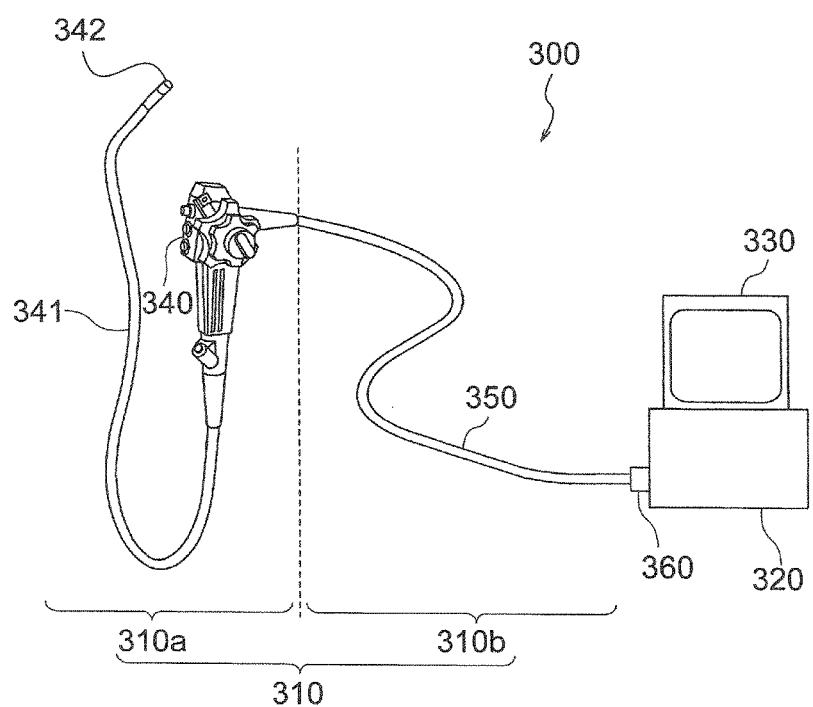
FIG. 16 is a diagram showing a schematic arrangement of an endoscope system.

FIG. 16 is a diagram illustrating another example of an image pickup apparatus. In this example, the image pickup apparatus is an endoscope system. FIG. 16 is a diagram showing a schematic arrangement of the endoscope system.

An endoscope system 300 is an observation system in which an electronic endoscope is used. The endoscope system 300 includes an electronic endoscope 310 and an image processing unit 320. The electronic endoscope 310 includes a scope section 310a and a connecting cord section 310b. Moreover, a display unit 330 is connected to the image processing unit 320.

The scope section 310a is mainly divided into an operating portion 340 and an inserting portion 341. The inserting portion 341 is long and slender, and can be inserted into a body cavity of a patient. Moreover, the inserting portion 341 is formed of a flexible member. An observer can carry out various operations by an angle knob that is provided to the operating portion 340.

Moreover, the connecting cord section 310b is extended from the operating portion 340. The connecting cord section 301b includes a universal cord 350. The universal cord 350 is connected to the image processing unit 320 via a connector 360.

The universal cord 350 is used for transceiving of various types of signals. Various types of signals include signals such as a power-supply voltage signal and a CCD (charge coupled device) driving signal. These signals are transmitted from a power supply unit and a video processor to the scope section 310a. Moreover, various types of signals include a video signal. This signal is transmitted from the scope section 310a to the video processor.

Peripheral equipment such as a VTR (video tape recorder) deck and a video printer can be connected to the video processor inside the image processing unit 320. The video processor carries out signal processing on a video signal from the scope section 310a. On the basis of the video signal, an endoscope image is displayed on a display screen of the display unit 330.

Figure 17:
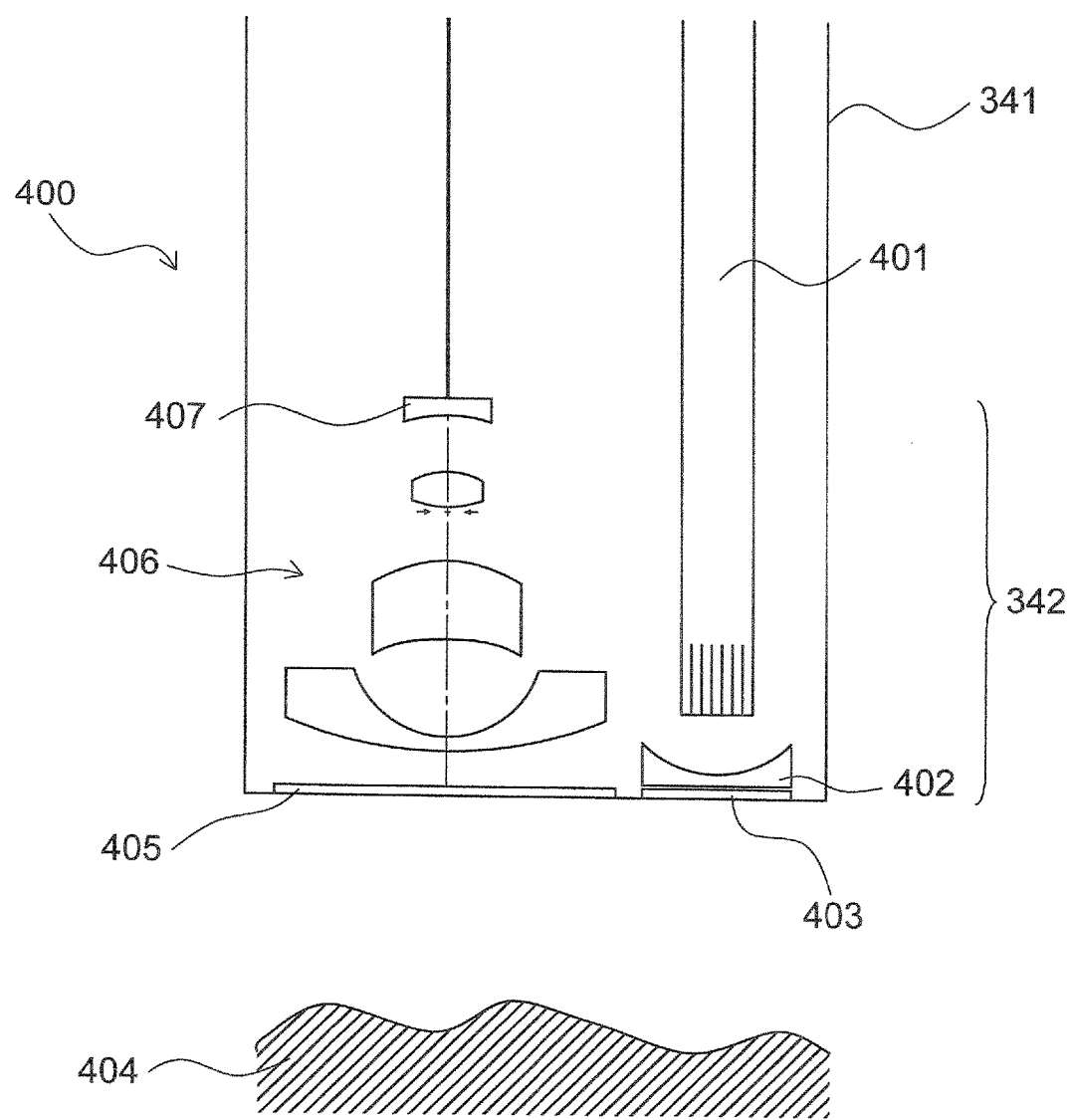
FIG. 17 is a diagram showing an arrangement of an optical system of an endoscope.

An optical system is disposed at a front-end portion 342 of the inserting portion 341. FIG. 17 is a diagram showing an arrangement of the optical system of the endoscope. An optical system 400 includes an illuminating section and an observation section.

The illuminating section includes a light guide 401 and an illumination lens 402. The light guide 401 transmits illumination light to a front-end portion 342 of an inserting portion 341. The illumination light transmitted emerges from a front-end surface of the light guide 401.

The illumination lens 402 is disposed at the front-end portion 342. The illumination lens 402 is disposed at a position facing a front-end surface of the light guide 401. The illumination light passes through the illumination lens 402, and emerges from an illumination window 403. Accordingly, a site to be observed inside a body to be examined (hereinafter, referred to as 'observation site 404') is illuminated.

In the front-end portion 342, an observation window 405 is provided adjacent to the illumination window 403. Light from the observation site 404 passes through the observation window 405, and is incident on the front-end portion 342. In a rear of the observation window 405, an observation section is provided.

The observation section includes an image forming optical system 406 and an image pickup element 407. For the image forming optical system 406, the image forming optical system of the example 1 is used.

Light reflected from the observation site 404 passes through the image forming optical system 406, and is incident on the image pickup element 407. An image (optical image) of the observation site 404 is formed on an image pickup surface of the image pickup element 407. The image of the observation site 404 is subjected to opto-electric conversion, and accordingly, an image of the observation site 404 is acquired. The image of the observation site 404 is displayed on a display unit 330. In such manner, an observer can observe the image of the observation site 404.

In the image forming optical system 406, an image plane has a curved shape. The image pickup element 407 has a light-receiving surface having a curved shape same as the shape of the image plane. By using the image pickup element 407, it is possible to improve an image quality of a photographic image.

According to the present invention, it is possible to provide an image pickup apparatus which is capable of photographing a wide photographic range with a high resolution, while being small-sized.

As described above, the present invention is suitable for an image pickup apparatus which is capable of photographing a wide photographic range with a high resolution, while being small-sized.

What is claimed is:
1. An image pickup apparatus, comprising:
   an image forming optical system which includes an aperture stop which determines an axial light beam, and a plurality of lens components, and an image pickup section which is disposed on an image side of the image forming optical system, and has a light-receiving surface which is not flat but is curved to be concave toward the image forming optical system, wherein:

the lens component is a lens having only two surfaces in contact with air on an optical axis, which are an object-side surface and an image-side surface, the image forming optical system includes, in order from an object side to the image side, a first lens component having a negative refractive power, a second lens component having a positive refractive power, and a third lens component having a positive refractive power, in the first lens component, a lens surface on the object side is convex toward the object side, in a lens surface on the object side of the second lens component, a part of an area is concave toward the object side, and the following conditional expressions (1) and (3) are satisfied:

$$0.5 < (R1L + R1R)/(R1L - R1R) < 2.5 \quad (1),$$

and $$0 < R3R/Rimg < 1.2 \quad (3)$$

where,

R1L denotes a paraxial radius of curvature of the lens surface on the object side, of the first lens component, R1R denotes a paraxial radius of curvature of a lens surface on the image side, of the first lens component, R3R denotes a paraxial radius of curvature of a lens surface on the image side, of the third lens component, and Rimg denotes a radius of curvature of a virtual spherical surface which includes a surface apex and a point in which a principal light ray incident at the maximum angle of view on the image forming optical system intersects a light-receiving surface, letting a point of intersection of the optical axis and the light receiving surface to be the surface apex.

2. The image pickup apparatus according to claim 1, wherein the following conditional expression (2) is satisfied:

$$0 \le |R1R/R2L| < 0.4 \quad (2)$$

where,

R1R denotes the paraxial radius of curvature of the lens surface on the image side, of the first lens component, and R2L denotes a paraxial radius of curvature of the lens surface on the object side, of the second lens component.

3. The image pickup apparatus according to claim 1, wherein the lens surface on the object side of the second lens component is an aspherical surface having a point of inflection in an off-axis effective surface on a cross-sectional surface including an optical axis.

4. The image pickup apparatus according to claim 1, wherein a lens surface which is positioned on the image side of the aperture stop and nearest to the aperture stop is convex toward the object side.

5. The image pickup apparatus according to claim 1, wherein each of the first lens component, the second lens component, and the third lens component is a single lens.

6. An image pickup apparatus, comprising:

an image forming optical system which includes an aperture stop which determines an axial light beam, and a plurality of lens components, and an image pickup section which is disposed on an image side of the image forming optical system, and has a light-receiving surface which is not flat but is curved to be concave toward the image forming optical system, wherein:

the lens component is a lens having only two surfaces in contact with air on an optical axis, which are an object-side surface and an image-side surface, the image forming optical system includes, in order from an object side to the image side, a first lens component having a negative refractive power, a second lens component having a positive refractive power, and a third lens component having a positive refractive power, in the first lens component, a lens surface on the object side is convex toward the object side, in a lens surface on the object side of the second lens component, a part of an area is concave toward the object side, and the following conditional expressions (1) and (4) are satisfied:

$$0.5 < (R1L + R1R)/(R1L - R1R) < 2.5 \quad (1),$$

and $$0.6 < |(Y1 \times 2)/Rimg| < 3 \quad (4)$$

where,

R1L denotes a paraxial radius of curvature of the lens surface on the object side, of the first lens component, R1R denotes a paraxial radius of curvature of a lens surface on the image side, of the first lens component, Y1 denotes a maximum light-ray height in a predetermined area, the predetermined area is an area on the lens surface on the object side of the first lens component, through which an effective light beam passes, and Rimg denotes a radius of curvature of a virtual spherical surface which includes a surface apex and a point in which a principal light ray incident at the maximum angle of view on the image forming optical system intersects a light-receiving surface, letting a point of intersection of the optical axis and the light-receiving surface to be the surface apex.

7. The image pickup apparatus according to claim 6, wherein the following conditional expression (2) is satisfied:

$$0 \le |R1R/R2L| < 0.4 \quad (2)$$

where,

R1R denotes the paraxial radius of curvature of the lens surface on the image side, of the first lens component, and R2L denotes a paraxial radius of curvature of the lens surface on the object side, of the second lens component.

8. The image pickup apparatus according to claim 6, wherein the lens surface on the object side of the second lens component is an aspherical surface having a point of inflection in an off-axis effective surface on a cross-sectional surface including an optical axis.

9. The image pickup apparatus according to claim 6, wherein a lens surface which is positioned on the image side of the aperture stop and nearest to the aperture stop is convex toward the object side.

10. The image pickup apparatus according to claim 6, wherein each of the first lens component, the second lens component, and the third lens component is a single lens.

11. An image pickup apparatus, comprising:
an image forming optical system which includes an aperture stop which determines an axial light beam, and a plurality of lens components, and
an image pickup section which is disposed on an image side of the image forming optical system, and has a light-receiving surface which is not flat but is curved to be concave toward the image forming optical system, wherein:
the lens component is a lens having only two surfaces in contact with air on an optical axis, which are an object-side surface and an image-side surface,
the image forming optical system includes, in order from an object side to the image side, a first lens component having a negative refractive power, a second lens component having a positive refractive power, and a third lens component having a positive refractive power,
in the first lens component, a lens surface on the object side is convex toward the object side,
in a lens surface on the object side of the second lens component, a part of an area is concave toward the object side, and
the following conditional expressions (1) and (5) are satisfied:

$$0.5 < (R1L+R1R)/(R1L-R1R) < 2.5 \quad (1),$$

and $$0.5 < |EXP/Rimg| \le 1 \quad (5)$$

where,
R1L denotes a paraxial radius of curvature of the lens surface on the object side, of the first lens component,
R1R denotes a paraxial radius of curvature of a lens surface on the image side, of the first lens component,
EXP denotes a distance along the optical axis from the light-receiving surface up to a paraxial exit-pupil position of the image forming optical system, and a sign when the paraxial exit-pupil position is on the object side of the light-receiving surface is let to be negative, and
Rimg denotes a radius of curvature of a virtual spherical surface which includes a surface apex and a point in which a principal light ray incident at the maximum angle of view on the image forming optical system intersects a light-receiving surface, letting a point of intersection of the optical axis and the light-receiving surface to be the surface apex.

12. The image pickup apparatus according to claim 11, wherein the following conditional expression (2) is satisfied:

$$0 \le |R1R/R2L| < 0.4 \quad (2)$$

where,
R1R denotes the paraxial radius of curvature of the lens surface on the image side, of the first lens component, and
R2L denotes a paraxial radius of curvature of the lens surface on the object side, of the second lens component.

13. The image pickup apparatus according to claim 11, wherein the lens surface on the object side of the second lens component is an aspherical surface having a point of inflection in an off-axis effective surface on a cross-sectional surface including an optical axis.

14. The image pickup apparatus according to claim 11, wherein a lens surface which is positioned on the image side of the aperture stop and nearest to the aperture stop is convex toward the object side.

15. The image pickup apparatus according to claim 11, wherein each of the first lens component, the second lens component, and the third lens component is a single lens.

16. An image pickup apparatus, comprising:
an image forming optical system which includes an aperture stop which determines an axial light beam, and a plurality of lens components, and
an image pickup section which is disposed on an image side of the image forming optical system, and has a light-receiving surface which is not flat but is curved to be concave toward the image forming optical system, wherein:
the lens component is a lens having only two surfaces in contact with air on an optical axis, which are an object-side surface and an image-side surface,
the image forming optical system includes, in order from an object side to the image side, a first lens component having a negative refractive power, a second lens component having a positive refractive power, and a third lens component having a positive refractive power,
in the first lens component, a lens surface on the object side is convex toward the object side,
in a lens surface on the object side of the second lens component, a part of an area is concave toward the object side, and
the following conditional expressions (1), (6), and (7) are satisfied:

$$0.5 < (R1L+R1R)/(R1L-R1R) < 2.5 \quad (1),$$

$$180° \le 2\omega \le 230° \quad (6),$$

and $$1.7 \le Fno \le 6.0 \quad (7)$$

where,
R1L denotes a paraxial radius of curvature of the lens surface on the object side, of the first lens component,
R1R denotes a paraxial radius of curvature of a lens surface on the image side, of the first lens component,
$\omega$ denotes a maximum half angle of view, and
Fno denotes an F-number.

17. The image pickup apparatus according to claim 16, wherein the following conditional expression (2) is satisfied:

$$0 \le |R1R/R2L| < 0.4 \quad (2)$$

where,
R1R denotes the paraxial radius of curvature of the lens surface on the image side, of the first lens component, and
R2L denotes a paraxial radius of curvature of the lens surface on the object side, of the second lens component.

18. The image pickup apparatus according to claim 16, wherein the lens surface on the object side of the second lens component is an aspherical surface having a point of inflection in an off-axis effective surface on a cross-sectional surface including an optical axis.

19. The image pickup apparatus according to claim 16, wherein a lens surface which is positioned on the image side of the aperture stop and nearest to the aperture stop is convex toward the object side.

20. The image pickup apparatus according to claim 16, wherein each of the first lens component, the second lens component, and the third lens component is a single lens.

* * * * *